US011940896B2

(12) United States Patent
Nagasaka et al.

(10) Patent No.: US 11,940,896 B2
(45) Date of Patent: Mar. 26, 2024

(54) INFORMATION PROCESSING DEVICE, INFORMATION PROCESSING METHOD, AND PROGRAM

(71) Applicant: Sony Group Corporation, Tokyo (JP)

(72) Inventors: Hideo Nagasaka, Tokyo (JP); Kei Takahashi, Tokyo (JP); Junichi Shimizu, Tokyo (JP)

(73) Assignee: Sony Group Corporation, Tokyo (JP)

( * ) Notice: Subject to any disclaimer, the term of this patent is extended or adjusted under 35 U.S.C. 154(b) by 525 days.

(21) Appl. No.: 17/265,213

(22) PCT Filed: Aug. 10, 2018

(86) PCT No.: PCT/JP2018/030036
§ 371 (c)(1),
(2) Date: Feb. 2, 2021

(87) PCT Pub. No.: WO2020/031367
PCT Pub. Date: Feb. 13, 2020

(65) Prior Publication Data
US 2021/0303439 A1   Sep. 30, 2021

(51) Int. Cl.
*G10L 15/22* (2006.01)
*G06F 3/01* (2006.01)
*G06F 11/34* (2006.01)

(52) U.S. Cl.
CPC .......... *G06F 11/3476* (2013.01); *G06F 3/017* (2013.01); *G06F 11/3438* (2013.01);
(Continued)

(58) Field of Classification Search
CPC . G06F 3/00; G10L 15/26; G10L 17/00; G10L 15/24; G10L 15/00
See application file for complete search history.

(56) References Cited

U.S. PATENT DOCUMENTS

2012/0313869 A1* 12/2012 Konami .............. G06F 3/04883
345/173
2021/0303439 A1* 9/2021 Nagasaka ............... G10L 15/22

FOREIGN PATENT DOCUMENTS

CN      102591448 A  *  7/2012  ............. G06F 3/017
JP      2012-256099 A     12/2012
(Continued)

OTHER PUBLICATIONS

11th Windows 10, Easily & Convenient, the Nikkei Personal Computer, Japan, Nikkei BP, No. 789, pp. 48-51, Mar. 12, 2018.
(Continued)

*Primary Examiner* — Shreyans A Patel
(74) *Attorney, Agent, or Firm* — XSENSUS LLP

(57) ABSTRACT

Erroneous ignitions of a process of a device caused by characteristics of speeches/behaviors of a user are efficiently prevented.
Provided is an information processing device having: a notification control unit configured to notify a user of information about a candidate speech/behavior estimated to be suitable as a trigger for executing a predetermined process among a plurality of speeches/behaviors extractable from a behavior log of the user, wherein the notification control unit further notifies the user of an inquiry whether or not execution of the candidate speech/behavior estimated from the behavior log is to be applied as the trigger, and the candidate speech/behavior is estimated based on a number of times by which the speech/behavior is extracted from the behavior log.

19 Claims, 16 Drawing Sheets

NOD

TURN TO RIGHT

TURN TO LEFT

PLAY OR STOP MUSIC

SKIP TO NEXT SONG

RETURN TO PREVIOUS SONG

(52) U.S. Cl.
CPC ........ *G10L 15/22* (2013.01); *G10L 2015/223* (2013.01); *G10L 2015/225* (2013.01)

(56) References Cited

FOREIGN PATENT DOCUMENTS

| | | | |
|---|---|---|---|
| JP | 2013-59083 A | | 3/2013 |
| JP | 2017-21461 A | | 1/2017 |
| JP | 6671928 B2 | * | 3/2020 |
| KR | 20200015298 A | * | 8/2018 |
| TW | I423645 B | * | 3/2011 |

OTHER PUBLICATIONS

Shirai, The Techno Trend Techno Trend012, The Nikkei Business, Japan, and Nikkei BP, pp. 94-96, No. 1934, Mar. 26, 2018.
International Search Report and Written Opinion dated Nov. 13, 2018, received for PCT Application PCT/JP2018/030036, Filed on Aug. 10, 2018, 10 pages including English Translation.

\* cited by examiner

FIG.3
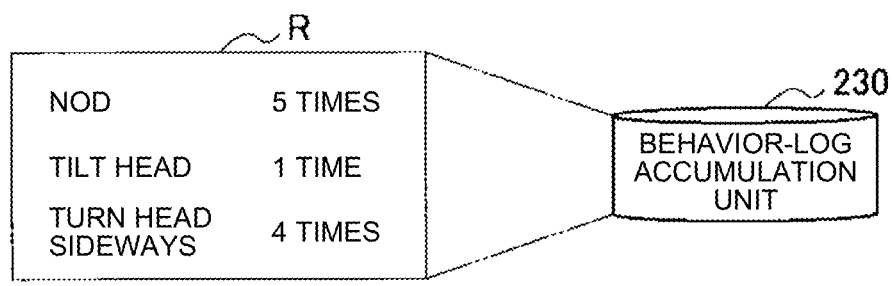
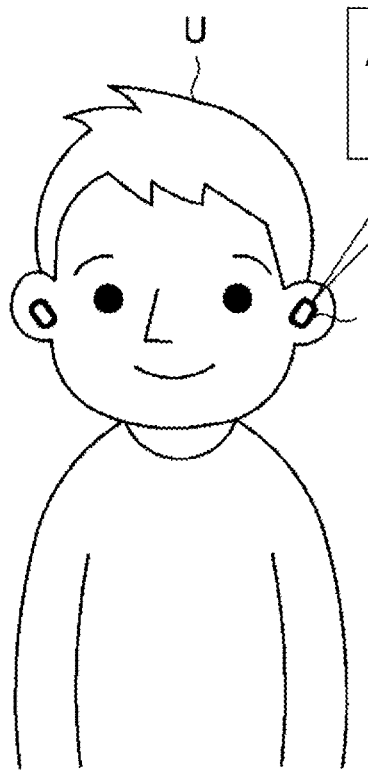

FIG.13
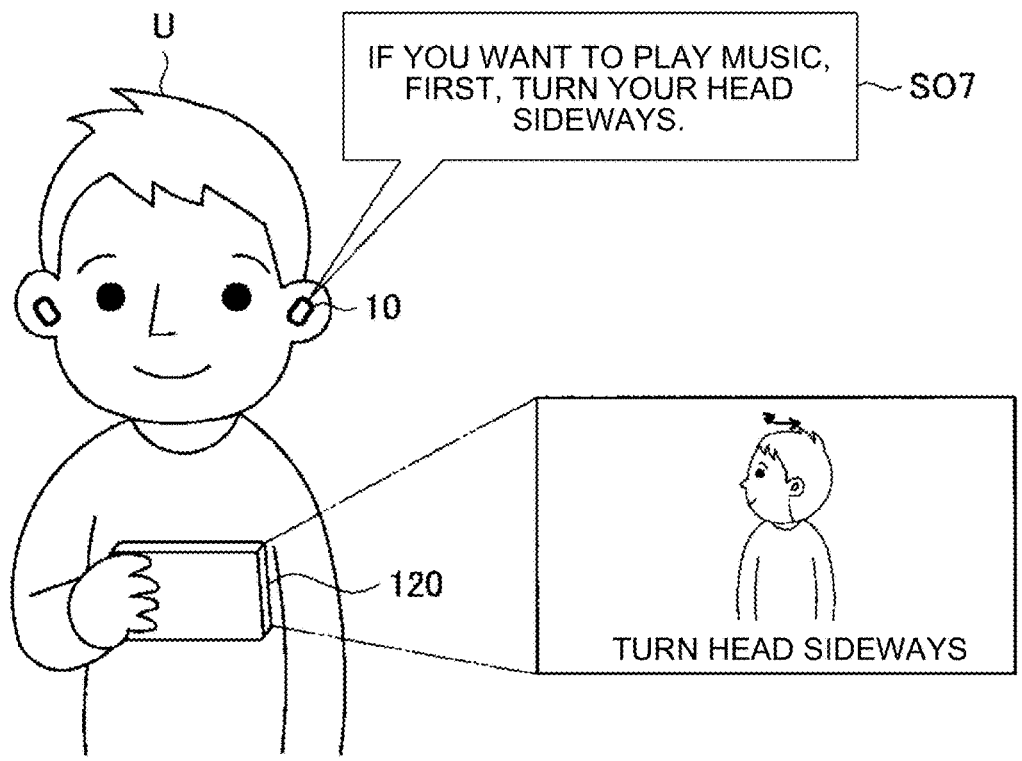
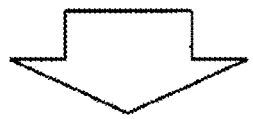
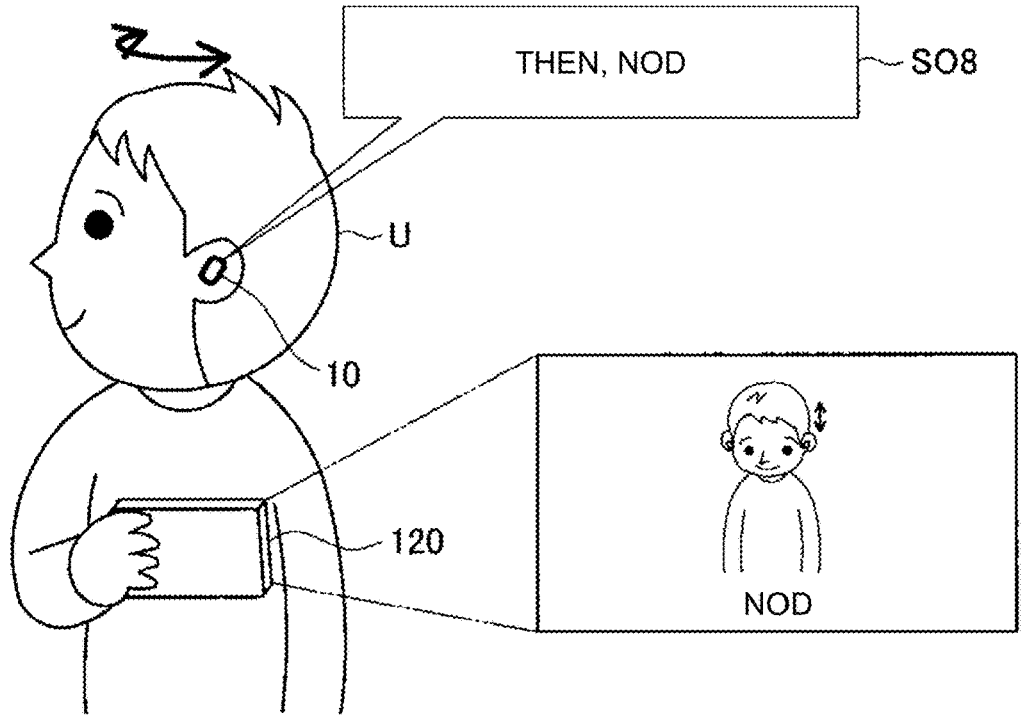

INFORMATION PROCESSING DEVICE, INFORMATION PROCESSING METHOD, AND PROGRAM

CROSS-REFERENCE TO RELATED APPLICATION

The present application is based on PCT filing PCT/JP2018/030036, filed Aug. 10, 2018, the entire contents of which are incorporated herein by reference.

FIELD

The present disclosure relates to an information processing device, an information processing method, and a program.

BACKGROUND

In recent years, a device which can be operated by using a gesture or a speech has become common. The techniques for enhancing the convenience of a user who uses a device like the one described above have been developed. Patent Literature 1 discloses the technique which facilitates gesture operations by showing, to the user, the amount of change in the posture about gestures used in the operations.

CITATION LIST

Patent Literature

Patent Literature 1: Japanese Laid-open Patent Publication No. 2017-21461

SUMMARY

Technical Problem

However, in the case of the device disclosed in Patent Literature 1, if an inclination or the like of the behavior of the user is similar to a gesture used for operation, the gesture may be recognized and cause erroneous ignition of a process at the timing which is not intended by the user.

Therefore, the present disclosure proposes an information processing device, an information processing method, and a program which are novel and improved and capable of efficiently preventing erroneous ignition of a process of a device caused by characteristics of speeches/behaviors of a user.

Solution to Problem

According to the application concerned, an information processing device is provided that includes: a notification control unit configured to notify a user of information about a candidate speech/behavior estimated to be suitable as a trigger for executing a predetermined process among a plurality of speeches/behaviors extractable from a behavior log of the user, wherein the notification control unit further notifies the user of an inquiry whether or not execution of the candidate speech/behavior estimated from the behavior log is to be applied as the trigger, and the candidate speech/behavior is estimated based on a number of times by which the speech/behavior is extracted from the behavior log.

According to the application concerned, an information processing method is provided that includes: by a processor, notifying a user of information about a candidate speech/behavior estimated to be suitable as a trigger for executing a predetermined process among a plurality of speeches/behaviors extractable from a behavior log of the user; and further notifying the user of an inquiry whether or not execution of the candidate speech/behavior estimated from the behavior log is to be applied as the trigger, wherein the candidate speech/behavior is estimated based on a number of times by which the speech/behavior is extracted from the behavior log.

According to the application concerned, a program is provided that causes a computer to function as an information processing device that includes: a notification control unit configured to notify a user of information about a candidate speech/behavior estimated to be suitable as a trigger for executing a predetermined process among a plurality of speeches/behaviors extractable from a behavior log of the user, wherein the notification control unit further notifies the user of an inquiry whether or not execution of the candidate speech/behavior estimated from the behavior log is to be applied as the trigger, and the candidate speech/behavior is estimated based on a number of times by which the speech/behavior is extracted from the behavior log.

Advantageous Effects of Invention

As explained above, according to the present disclosure, the erroneous ignition of the process of the device caused by the characteristics of the speeches/behaviors of the user can be efficiently prevented.

Note that the above described effects are not necessarily limitative, and any of the effects shown in the present description or any other effect(s) which can be construed from the present description may be exerted together with the above described effects or instead of the above described effects.

BRIEF DESCRIPTION OF DRAWINGS

FIG. 3 is a drawing for explaining an outline of notification control according to the present embodiment.

FIG. 13 is a drawing illustrating an example of a case in which the user is notified of information about a combination of speeches/behaviors applied as the trigger according to the present embodiment.

DESCRIPTION OF EMBODIMENTS

Hereinafter, a preferred embodiment of the present disclosure will be described in detail with reference to accompanying drawings. Note that, in the present description and drawings, regarding the constituent elements having practically the same functional configurations, redundant explanations are omitted by denoting them by the same reference signs.

Note that explanations will be given in the following order.

1. Embodiment
1.1. Outlines
1.2. Example of Information Processing Terminal 10
1.3. System Configuration Example
1.4. Functional Configuration Example of Information Processing Terminal 10
1.5. Functional Configuration Example of Information Processing Server 20
1.6. Specific Examples of Inquiry Notification about Application
1.7. Flow of Control
2. Hardware Configuration Example
3. Conclusion 1. Embodiments <<1.1. Outlines>>

First, outlines of an embodiment of the present disclosure will be described. As described above, in recent years, devices which can be operated by using gestures and/or speeches have become common. A user can cause such a device to execute various processes, for example, by performing a predetermined gesture such as nodding or turning his/her head or speaking an activation word (Wake up word).

Examples of the devices which are operated by using gestures and/or speeches include wearable devices. Examples of the wearable devices include a head-mounted display which is worn on the head of a user to provide visual information and/or voice information.

On the other hand, in recent years, a terminal which does not have a display device such as a hearable device worn on the ear of a user has also become common as a type of wearable devices. In a case of the hearable device, the user can operate the device, for example, by speeches, equipment operation (pressing buttons, touch operation, etc.), and/or gestures.

However, the operation control by speech is difficult in many cases, for example, since the speech may bother others in public places or the like or because of psychological resistance. Meanwhile, operation using another terminal such as touch operation with respect to a terminal such as a smartphone linked with the hearable device is complicated. Moreover, the hearable device does not have a lot of information which can be visually confirmed, and the range of device operation thereof may be narrow compared with a wearable device which has a display device such as a head-mounted display. Therefore, operating the device by using gestures is more convenient for the user compared with other operation methods.

Figure 1:
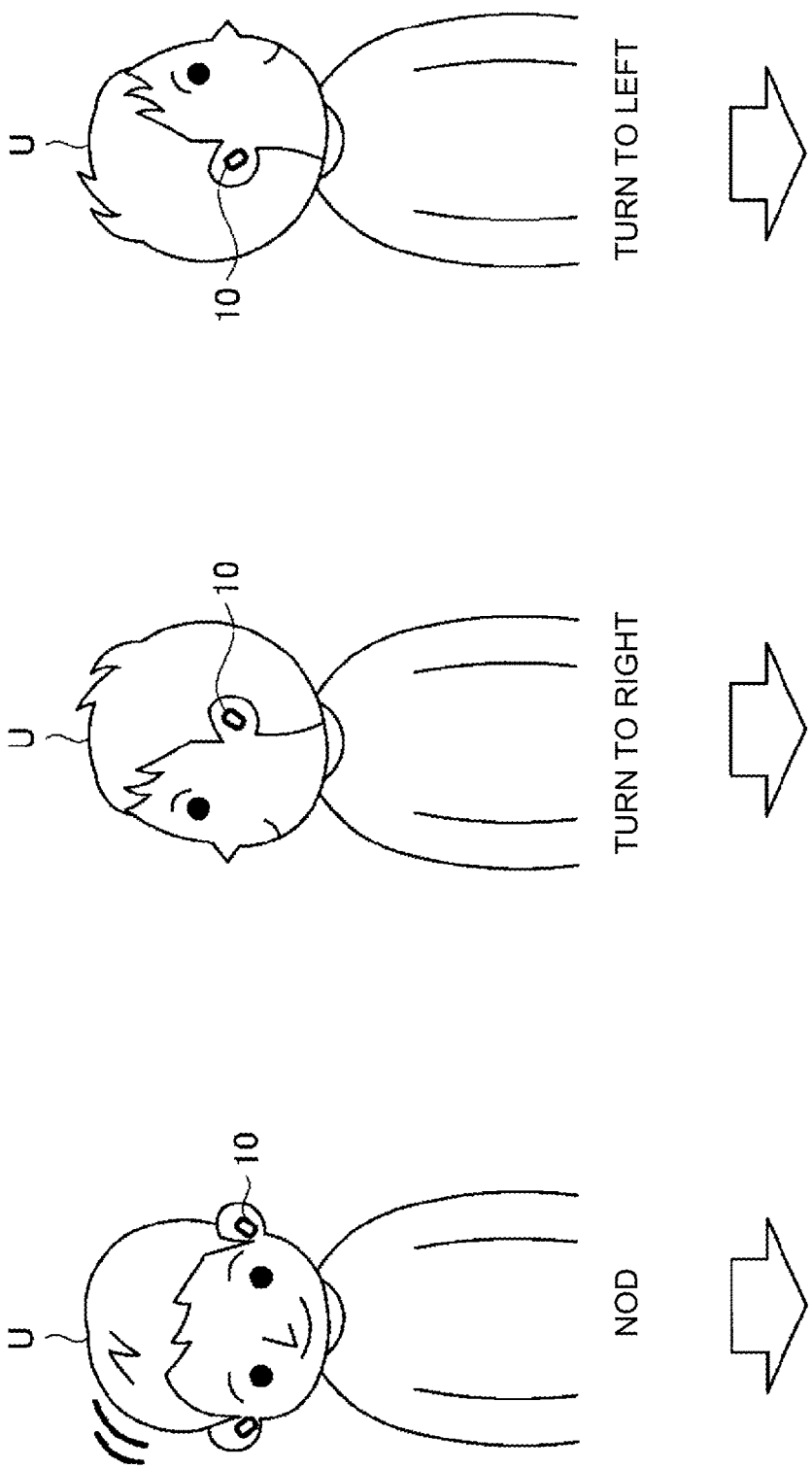
FIG. 1 is a drawing for explaining examples of equipment operations by gestures.

FIG. 1 is a drawing for explaining examples of equipment operations by gestures. FIG. 1 illustrates a user U wearing an information processing terminal 10 and executing gestures. In this case, the user U can cause the information processing terminal 10 to execute predetermined processes corresponding to the respective gestures by performing the gestures. Herein, the predetermined processes refer to execution of functions of the information processing terminal 10 such as "PLAY MUSIC", "SKIP TO NEXT SONG", and "MAKE A PHONE CALL". For example, if the user U nods, the information processing terminal 10 executes a music play process or stop process. Also, if the user U turn to the right, the information processing terminal 10 executes a process to skip from the currently played music to the next song. Also, if the user U turns to the left, the information processing terminal 10 executes a process to return from the currently played music to a previous song.

Figure 2:
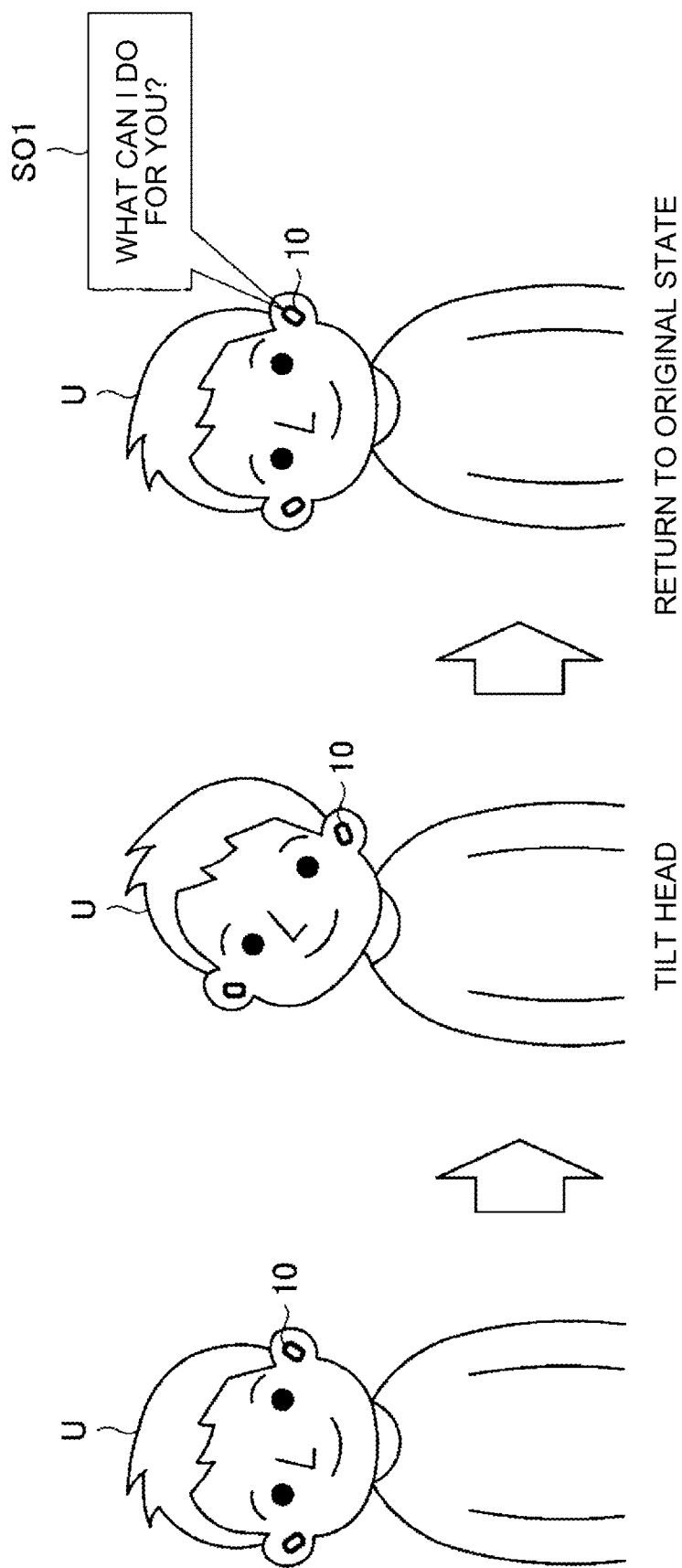
FIG. 2 is a drawing for explaining an example of device operations by an activation gesture.

FIG. 2 is a drawing for explaining an example of device operations by an activation gesture. FIG. 2 illustrates the user U wearing the information processing terminal 10 and executing the activation gesture. Herein, the activation gesture refers to a gesture which is applied as an activation trigger to start an interaction with an agent function via the information processing terminal 10. In the case of the example illustrated in FIG. 2, the user U performs an action of tilting his/her head as an example of the activation gesture. Herein, when the activation gesture by the user U is recognized, the agent function is activated, and the interaction between the user U and the agent function is started. In this case, the information processing terminal 10 executes a system speech SO1 for notifying the user U of start of the interaction.

As illustrated in FIG. 1 and FIG. 2, in the device which can be operated by using gestures, various gestures are allocated as triggers for executing various processes.

However, behaviors similar to the gestures as described above may occur in daily life. Therefore, for example, if a gesture inclination or the like of the user is similar to a gesture which is used as a trigger of a process, the process of the device may be erroneously ignited (erroneously occur) at the timing which is not intended by the user. For example, if a device which is operated by a gesture of tilting the head is used by a user who has a gesture inclination of tilting his/her head, there will be many erroneous ignitions compared with other users. Herein, the erroneous ignition refers to occurrence of an event process which is not intended by the user.

The technical idea according to the embodiment of the present disclosure has been conceived by focusing on the above described point and is capable of preventing erroneous ignition of the process of the device caused by speeches/behaviors of the user. Therefore, an information processing device according to an embodiment of the present disclosure has a function to notify a user of information about a candidate speech/behavior estimated to be suitable as a trigger for executing a predetermined process among a plurality of speeches/behaviors extracted from a behavior log of the user. Also, one of characteristics of the information processing device according to the present embodiment is to further notify the user of an inquiry whether or not execution of the candidate speech/behavior estimated from the behavior log is to be applied as the trigger and to estimate the candidate speech/behavior based on the number of times of the predetermined speech/behavior recognized from the behavior log.

FIG. 3 is a drawing for explaining an outline of notification control according to the present embodiment. The upper side of FIG. 3 illustrates a behavior-log accumulation unit 230, in which a behavior log of the user U is accumulated, and a recognition result R showing the number of times of predetermined speeches/behaviors extracted from the above described behavior log.

Herein, the predetermined speeches/behaviors refer to the speeches/behaviors determined in advance and the speeches/behaviors which are practical as triggers for executing processes. The behavior log may be a behavior log in which, for example, the behavior history of one day of the user U is accumulated.

In the upper side of FIG. 3, a later-described information processing server 20 estimates a candidate speech/behavior, which is suitable as a trigger for executing a process, based on a plurality of speeches/behaviors extracted from the behavior log of the user U. Specifically, the information processing server 20 estimates the candidate speech/behavior based on the number of times of the predetermined actions or speeches included in the recognition result R extracted from the behavior log.

In the case of the example illustrated in the upper side of FIG. 3, it can be understood that, for example, 5 times of "nodding" actions, 1 time of "tilting the head" action, and 4 times of "turning the head sideways" actions are recognized in the recognition result R. In this case, the information processing server 20 may estimate that the "TILT HEAD" action, which is the action having the smallest number of times of extraction among the above described three types of actions, is suitable as the trigger for executing the process. In this case, since the action having the smallest number of times of extraction is used as the trigger, the possibility of occurrence of erroneous ignition of the process of the device due to recognition of the action at the timing not intended by the user is minimized.

The lower side of FIG. 3 illustrates the user U wearing the information processing terminal 10 executing a system speech SO2 for notifying the user U of an inquiry whether or not a predetermined speech/behavior is to be applied as a trigger for executing a predetermined process. Herein, the information processing terminal 10 can notify the user U of the inquiry whether or not the candidate speech/behavior, which has been estimated by the information processing server 20 to be suitable as the trigger for executing the process, is to be applied as the trigger based on the above described recognition result R.

In the case of the example illustrated in the lower side of FIG. 3, the information processing terminal 10 according to the present embodiment is executing the system speech SO2 which notifies the inquiry whether or not the gesture of "TILT HEAD" is to be applied as the activation gesture.

In this manner, according to the information processing terminal 10 and the information processing server 20 according to the present embodiment, based on the characteristics of the speeches/behaviors of the user, the user can be notified of the information about the candidate speech/behavior suitable as the trigger for executing the process. According to this function, in a case in which a user does not intend to execute a process, execution of the process, in other words, occurrence of erroneous ignition can be efficiently prevented. Moreover, since the candidate speech/behavior is applied as the trigger by informing each user of the inclination of the actions of himself/herself, the user can be enabled to understand the fact that the possibility of occurrence of erroneous ignition is going to be lower thereafter.

Herein, when the above described candidate speech/behavior is applied as the trigger for executing the process, the information processing terminal 10 according to the present embodiment may notify the user U of the information about the candidate speech/behavior. In the example of FIG. 3, the information processing terminal 10 according to the present embodiment may notify the user U of the information about the action of "TILT HEAD" estimated to be suitable as the activation gesture by an estimation unit 240 to urge the user to execute the action.

<<1.2. Example of Information Processing Terminal 10>>

Figure 4:
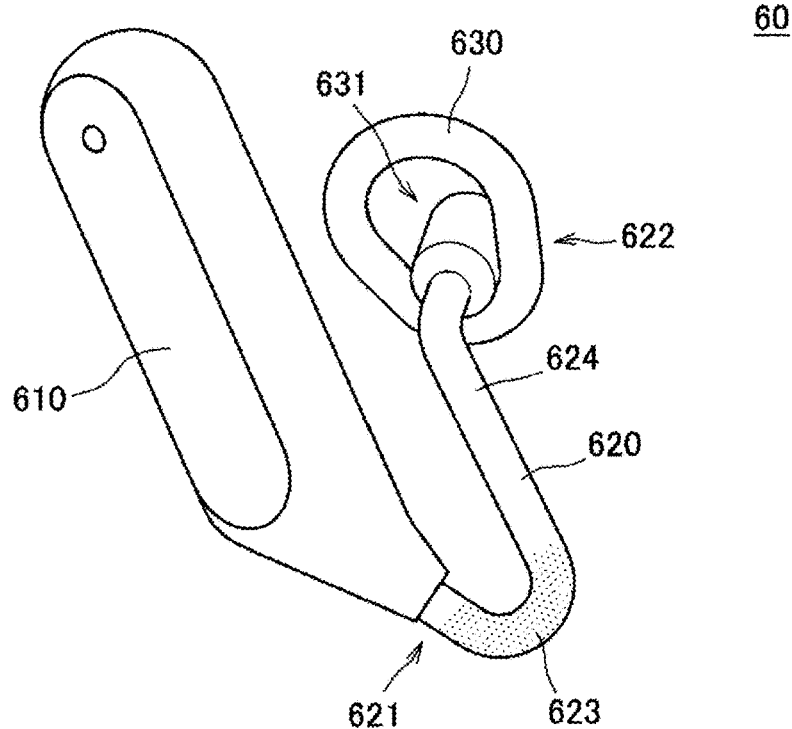
FIG. 4 is a drawing illustrating a basic structure of an information processing terminal 10 according to the present embodiment.

Next, an example of the information processing terminal 10 according to the present embodiment will be explained. The information processing terminal 10 according to the present embodiment is an information processing device which gives a notification to the user based on control by the information processing server 20. FIG. 4 is a drawing illustrating a basic structure of the information processing terminal 10 according to the present embodiment. Note that FIG. 4 illustrates an example of the basic structure in a case in which the information processing terminal 10 according to the present embodiment is a bearable device.

According to FIG. 4, the information processing terminal 10 according to the present embodiment is provided with a sound generation unit 610 which generates sound, a sound derivation unit 620 which takes in the sound generated by the sound generation unit 610 from a first end 621, and a retention unit 630 which retains the sound derivation unit 620 in a vicinity of a second end 622. The sound derivation unit 620 includes, for example, a hollow pipe material having an inner diameter of 1 to 5 millimeters, and both ends thereof may be open ends. Also, the first end 621 of the sound derivation unit 620 is a sound input hole for the sound generated from the sound generation unit 610, and the second end 622 functions as a sound output hole. Therefore, since the first end 621 is attached to the sound generation unit 610, the sound derivation unit 620 is in a one-side open state.

Moreover, the retention unit 630 is engaged with a vicinity of the entrance of the ear canal (for example, intertragic notch) and supports the sound derivation unit 620 in the vicinity of the second end 622 so that a sound output hole of the second end 622 of the sound derivation unit 620 is directed toward the deep side of the ear canal. The outer diameter of the vicinity of at least the second end 622 of the sound derivation unit 620 is formed to be much smaller than the inner diameter of the earhole. Therefore, even in a state in which the second end 622 of the sound derivation unit 620 is retained in the vicinity of the entrance of the ear canal by the retention unit 630, the earhole of the user is not blocked. In other words, the earhole is open. The information processing terminal 10 can be called "earhole open type" different from a general earpiece.

Moreover, the retention unit 630 is provided with an opening part 631 which keeps the entrance of the ear canal (earhole) open to the environment even in a state in which the sound derivation unit 620 is retained. In the example illustrated in FIG. 4, the retention unit 630 is a ring-like structure, and part of the inner side thereof is coupled to the vicinity of the second end 622 of the sound derivation unit 620. Therefore, all the other part of the ring-like structure serves as the opening part 631. Note that the retention unit 630 is not limited to the ring-like structure, but, as long as it has a hollow structure, may have an arbitrary shape that can support the second end 622 of the sound derivation unit 620.

When the pipe-like sound derivation unit 620 takes the sound, which is emitted from the sound generation unit 610, from the first end 621 into the pipe, the sound derivation unit 620 propagates air vibrations, releases the air vibrations from the second end 622, which is retained in the vicinity of the entrance of the ear canal by the retention unit 630, toward the ear canal, and transmits the air vibrations to the eardrum.

As described above, the retention unit 630, which retains the vicinity of the second end 622 of the sound derivation unit 620, is provided with the opening part 631, which opens the entrance (earhole) of the ear canal to the environment. Therefore, even when the information processing terminal 10 is worn, the earhole of the user is not blocked. Even while the user is wearing the information processing terminal 10 and listening to the sound output from the sound generation unit 610, the user can sufficiently listen to ambient sound via the opening part 631.

Moreover, the information processing terminal 10 according to the present embodiment keeps the earhole open, but can prevent leakage of the sound generated (sound reproduced) from the sound generation unit 610 to the outside. A reason for the above is that sufficient sound quality can be obtained even when output is reduced since the second end 622 of the sound derivation unit 620 is attached in the vicinity of the entrance of the ear canal so as to be directed toward the deep side and radiates the air vibrations of the generated sound near the eardrum.

Figure 5:
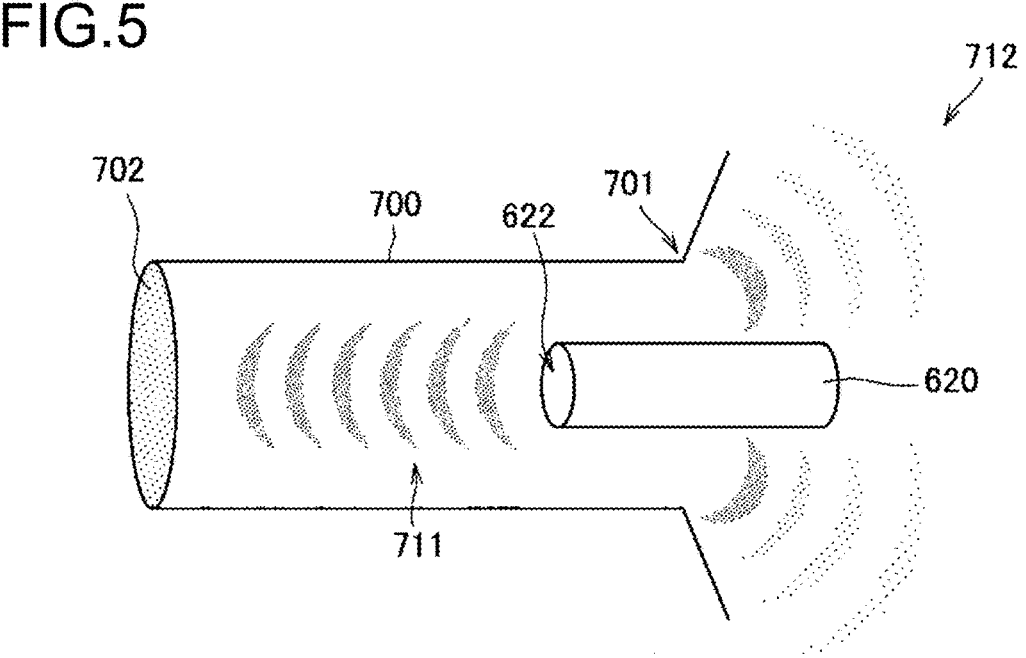
FIG. 5 illustrates a state in which the information processing terminal 10 of an earhole open type outputs sound waves to an ear of a user.

Moreover, the directionality of the air vibrations radiated from the second end 622 of the sound derivation unit 620 also contributes to prevention of sound leakage. FIG. 5 illustrates a state in which the information processing terminal 10 of the earhole open type outputs sound waves to the ear of a user. As illustrated in FIG. 5, the air vibrations are radiated from the second end 622 of the sound derivation unit 620 toward the interior of the ear canal. An ear canal 700 is a hole which starts from an ear canal entrance 701 and ends at the inner side of an eardrum 702 and generally has a length of about 25 to 30 millimeters. The ear canal 700 is an enclosed space having a tubular shape. Therefore, the air vibrations radiated from the second end 622 of the sound derivation unit 620 toward the deep side of the ear canal 700 propagate to the eardrum 702 with directionality as illustrated with a reference number 711. Also, since the sound pressure increases in the ear canal 700, the sensitivity (gain) of the air vibrations is improved particularly in a low range. On the other hand, the outside of the ear canal 700, in other words, the environment is an open space. Therefore, the air vibrations radiated from the second end 622 of the sound derivation unit 620 to the outside of the ear canal 700 do not have directionality in the environment and is rapidly attenuated as illustrated with a reference number 712.

Explanations will be given with reference to FIG. 4 again. The pipe-like sound derivation unit 620 has, at an intermediate part thereof, a bent shape which is bent from a back side to the front side of the ear pinna. This bent part serves as a pinch part 623 having an opening/closing structure and can sandwich the earlobe by generating pinching force.

Moreover, the sound derivation unit 620 further has a deformation part 624 between the second end 622, which is disposed in the vicinity of the entrance of the ear canal, and the pinch part 623, which bends. The deformation part 624 has a function of deforming when excessive external force acts thereon so that the second end 622 of the sound derivation unit 620 does not get into the deeper side of the ear canal more than necessary.

Hereinafter, characteristics of the information processing device according to the present embodiment and the effects exerted by the characteristics will be explained in detail. Note that, hereinafter, a case in which the information processing terminal 10 which carries out notification of information is a bearable device will be explained as a main example, but the information processing terminal 10 according to the present embodiment is not limited to that example. The information processing terminal 10 according to the present embodiment is any of various devices which notifies a user of the information about a candidate speech/behavior.

<<1.3. System Configuration Example>>

Figure 6:
FIG. 6 is a block diagram illustrating a configuration example of an information processing system according to the present embodiment.

Next, a configuration example of an information processing system according to an embodiment of the present disclosure will be explained. FIG. 6 is a block diagram illustrating a configuration example of the information processing system according to the present embodiment. The information processing system is provided with the information processing terminal 10 and the information processing server 20. Moreover, the above described components are connected via a network 30 so that information can be communicated mutually.

(Information Processing Terminal 10)

The information processing terminal 10 according to the present embodiment is an information processing device which notifies a user of the information about a candidate speech/behavior which has been estimated to be suitable as a trigger for executing a process based on control by the information processing server 20. The information processing terminal 10 according to the present embodiment may be, for example, a bearable device as explained by using FIG. 4 and FIG. 5. On the other hand, the information processing terminal 10 according to the present embodiment is not limited to that example. The information processing terminal 10 according to the present embodiment may be, for example, a wearable device such as a head-mounted display or a dedicated device of a standing type or an autonomous mobile type. The information processing terminal 10 according to the present embodiment may be any of various devices which executes a process based on a gesture or a speech of a user.

Moreover, the information processing terminal 10 according to the present embodiment has a function to collect sensor information about user behaviors or a surrounding environment by using various sensors such as an acceleration sensor. The sensor information collected by the information processing terminal 10 is accumulated in the information processing server 20 and is used for estimation of the candidate speech/behavior which is suitable as the trigger for executing the process.

(Information Processing Server 20)

The information processing server 20 according to the present embodiment recognizes predetermined speeches/behaviors from the sensor information and accumulates them as a behavior log of the user. Moreover, the information processing server 20 according to the present embodiment estimates the candidate speech/behavior, which is suitable as the trigger for executing the process, based on the numbers of times of the predetermined speeches/behaviors stored in the behavior log and notifies the user of the information about the candidate speech/behavior. A characteristic of the information processing server 20 according to the present embodiment in this process is that the information processing server 20 notifies the user of the inquiry whether or not execution of the candidate speech/behavior estimated from the above described behavior log is to be applied as the trigger. Details of the functions of the information processing server 20 according to the present embodiment will be separately described later in detail.

(Network 30)

The network 30 has a function to connect the components which are provided in the information processing system. The network 30 may include: public line networks such as the Internet, a telephone network, and a satellite communication network; various Local Area Networks (LANs) including Ethernet (registered trademark); Wide Area Network (WAN); etc. Also, the network 30 may include a dedicated line network such as Internet Protocol-Virtual Private Network (IP-VPN). Also, the network 30 may include a radio communication network such as Wi-Fi (registered trademark), Bluetooth (registered trademark), or the like.

Hereinabove, the configuration example of the information processing system according to the present embodiment has been explained. Note that the system configuration explained by using FIG. 6 is merely an example, and the configuration of the information processing system according to the present embodiment is not limited to that example. For example, the functions of the information processing terminal 10 and the information processing server 20 according to the present embodiment may be realized by a single device. The configuration of the information processing system according to the present embodiment can be flexibly changed depending on specifications and/or operation.

<<1.4. Functional Configuration Example of Information Processing Terminal 10>>

Figure 7:
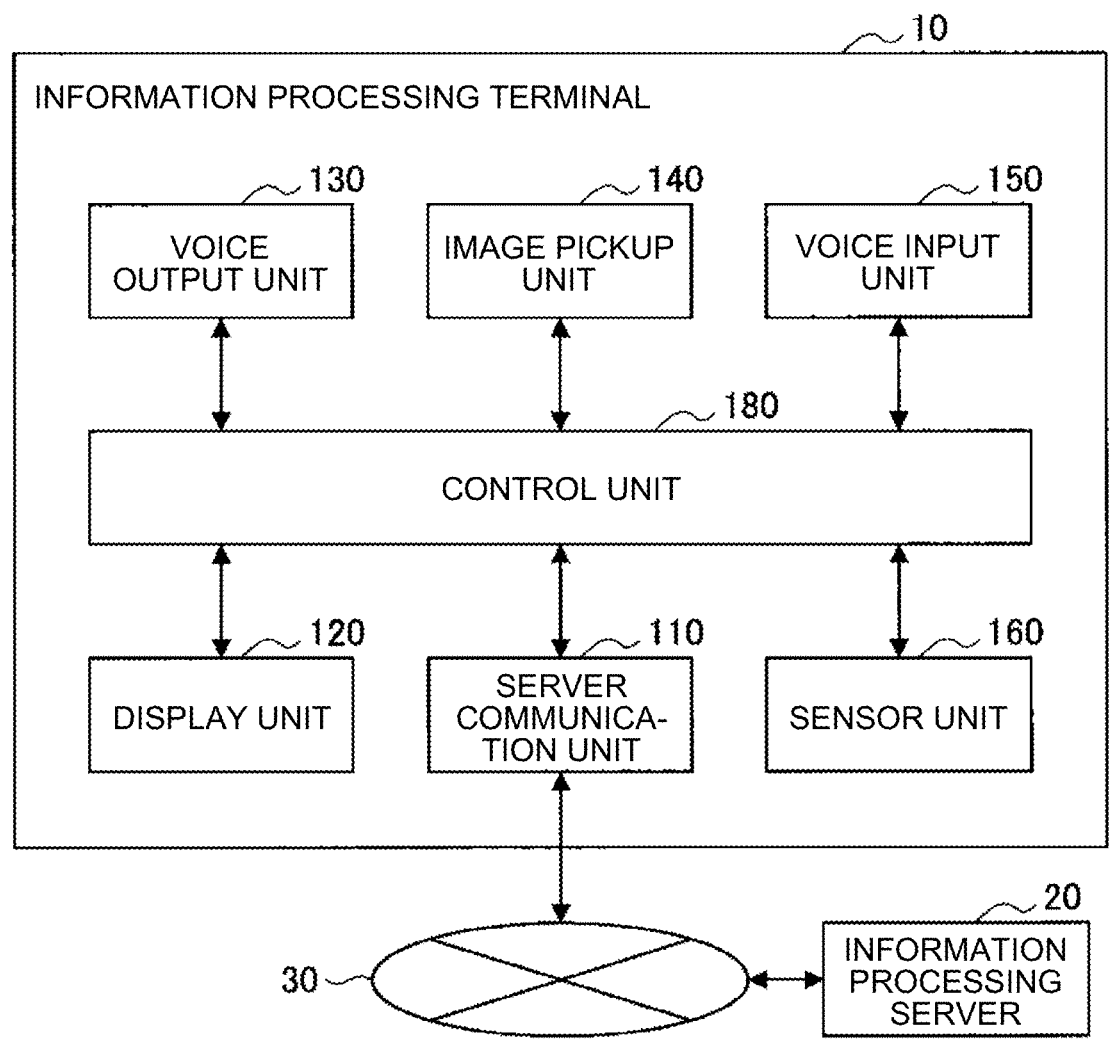
FIG. 7 is a block diagram illustrating a functional configuration example of the information processing terminal 10 according to the present embodiment.

Next, a functional configuration example of the information processing terminal 10 according to the present embodiment will be explained. FIG. 7 is a block diagram illustrating a functional configuration example of the information processing terminal 10 according to the present embodiment. With reference to FIG. 7, the information processing terminal 10 according to the present embodiment is provided with a server communication unit 110, a display unit 120, a voice output unit 130, an image pickup unit 140, a voice input unit 150, a sensor unit 160, and a control unit 180.

(Server Communication Unit 110)

The server communication unit 110 according to the present embodiment has a function to carry out information communication with the information processing server 20 via the network 30. Specifically, the server communication unit 110 transmits the sound information collected by the voice input unit 150 and the sensor information collected by the sensor unit 160 to the information processing server 20. Moreover, the server communication unit 110 receives, for example, the information about the candidate speech/behavior, which has been estimated by the later-described estimation unit 240 to be suitable as the trigger for executing the process, from the information processing server 20.

(Display Unit 120)

The display unit 120 according to the present embodiment has a function to output visual information such as images and texts under control by the control unit 180. The display unit 120 according to the present embodiment is provided with, for example, a display device which presents the visual information. Examples of the above described display device include a liquid crystal display (LCD: Liquid Crystal Display) device, an Organic light Emitting Diode (OLED) device, and a touch panel. Meanwhile, the display unit 120 according to the present embodiment is not necessarily required to be provided in the information processing terminal 10. For example, the information processing terminal 10 may use a smartphone via the network 30 as the display unit 120.

(Voice Output Unit 130)

The voice output unit 130 according to the present embodiment has a function to output various sounds including voice speeches. The voice output unit 130 according to the present embodiment may also be referred to as a notification unit which notifies the user of the information about the candidate speech/behavior based on the control by the information processing server 20. In order to do that, the voice output unit 130 according to the present embodiment is provided with a voice output device such as a speaker or an amplifier.

(Image Pickup Unit 140)

The image pickup unit 140 according to the present embodiment has a function to pick up moving images of the user or the surrounding environment. The image information picked up by the image pickup unit 140 is used for behavior recognition or state recognition of the user and/or recognition of the surrounding environment by the information processing server 20. The image pickup unit 140 according to the present embodiment is provided with an image pickup device which can pick up images. Note that the above described images include still images in addition to moving images.

(Voice Input Unit 150)

The voice input unit 150 according to the present embodiment has a function to collect sound information such as speeches made by the user and ambient sound generated in the surrounding of the information processing terminal 10. The sound information collected by the voice input unit 150 is used for, for example, voice recognition and/or recognition of the surrounding environment by the information processing server 20. The voice input unit 150 according to the present embodiment is provided with a microphone for collecting the sound information.

(Sensor Unit 160)

The sensor unit 160 according to the present embodiment has a function to collect the sensor information about the behaviors of the user and the surrounding environment by using various sensors. A later-described recognition unit 220 recognizes predetermined actions based on the sensor information collected by the sensor unit 160. The sensor unit 160 is provided with, for example, an acceleration sensor, a gyroscope sensor, a geomagnetic sensor, a vibration sensor, and a Global Navigation Satellite System (GNSS) signal reception device.

(Control Unit 180)

The control unit 180 according to the present embodiment has a function to control each of the components of the information processing terminal 10. The control unit 180 controls, for example, activation and stop of each of the components. Moreover, the control unit 180 inputs control signals, which are generated by the information processing server 20 and received by the server communication unit 110, to the display unit 120 and the voice output unit 130. Moreover, the control unit 180 according to the present embodiment may have a function equivalent to that of a later-described notification control unit 260 of the information processing server 20.

Hereinabove, the functional configuration example of the information processing terminal 10 according to the present embodiment has been explained. Note that the above described configuration explained by using FIG. 7 is merely an example, and the functional configuration of the information processing terminal 10 according to the present embodiment is not limited to that example. For example, as described above, the control unit 180 according to the present embodiment may have the function equivalent to that of the notification control unit 260 of the information processing server 20. The functional configuration of the information processing terminal 10 according to the present embodiment can be flexibly changed depending on specifications and/or operation.

<<1.5. Functional Configuration Example of Information Processing Server 20>>

Figure 8:
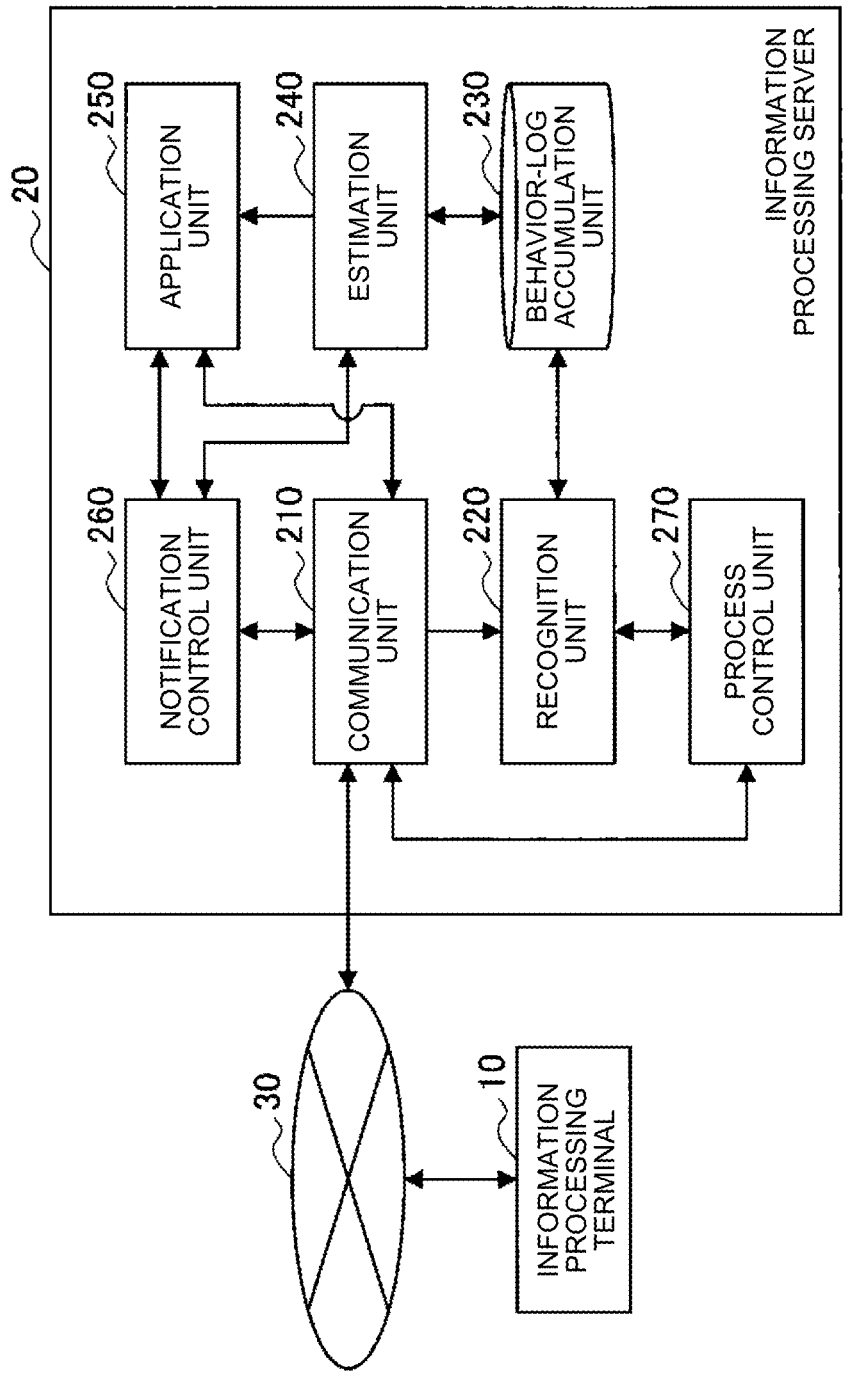
FIG. 8 is a block diagram illustrating a functional configuration example of an information processing server 20 according to the present embodiment.

Next, a functional configuration example of the information processing server 20 according to the present embodiment will be explained. FIG. 8 is a block diagram illustrating the functional configuration example of the information processing server 20 according to the present embodiment. With reference to FIG. 8, the information processing server 20 according to the present embodiment is provided with a communication unit 210, the recognition unit 220, the behavior-log accumulation unit 230, the estimation unit 240, an application unit 250, the notification control unit 260, and a process control unit 270.

(Communication Unit 210)

The communication unit 210 according to the present embodiment has a function to carry out information communication with the information processing terminal 10 via the network 30. For example, the communication unit 210 receives the sensor information and the sound information from the information processing terminal 10 and transmits the information about the candidate speech/behavior, which has been estimated by the later-described estimation unit 240 to be suitable as the trigger for executing the process, to the information processing terminal 10.

(Recognition Unit 220)

The recognition unit 220 according to the present embodiment has a function to recognize the speeches/behaviors of the user based on the sensor information collected by the information processing terminal 10, in other words, has a gesture recognition function and a voice recognition function. The recognition unit 220 recognizes the predetermined speeches/behaviors from the sensor information and the sound information, which has been received from the communication unit 210, and transmits the information about the speeches/behaviors to the behavior-log accumulation unit 230. Note that the recognition unit 220 can recognize various speeches/behaviors and the surrounding environment based on the collected acceleration information, angular speed information, voice, images, and so on.

(Behavior-Log Accumulation Unit 230)

The behavior-log accumulation unit 230 according to the present embodiment accumulates behavior logs about the speeches/behaviors of the user recognized by the recognition unit 220. Also, the behavior-log accumulation unit 230 according to the present embodiment accumulates histories of operations of the user with respect to the information processing terminal 10 (particularly, histories of the gestures recognized by the recognition unit 220 and operations corresponding to the gestures). The behavior logs and the operation histories are used by the estimation unit 240 for estimating a candidate speech/behavior.

(Estimation Unit 240)

The estimation unit 240 according to the present embodiment extracts a plurality of predetermined speeches/behaviors from the behavior logs of the user accumulated in the behavior-log accumulation unit 230 and estimates the candidate speech/behavior, which is suitable as the trigger for executing the process, based on the numbers of times of the plurality of predetermined speeches/behaviors. The estimation unit 240 according to the present embodiment may estimate, for example, a speech/behavior, which has the least number of times of recognition by the recognition unit 220 among the plurality of predetermined speeches/behaviors, as the candidate speech/behavior suitable as the trigger.

Note that the estimation unit 240 may estimate the candidate speech/behavior depending on the category and/or characteristics of the process. Specifically, the estimation unit 240 may estimate gestures which have different possibilities of erroneous ignition depending on the importance of the processes. More specifically, the estimation unit 240 may estimate a candidate speech/behavior which is a gesture having a lower possibility of erroneous ignition and prioritized as a trigger for a process having a high frequency of usage by the user U among a plurality of processes.

(Application Unit 250)

The application unit 250 according to the present embodiment has a function to apply the candidate speech/behavior estimated by the estimation unit 240 as the trigger for executing the process. The application unit 250 according to the present embodiment applies, for example, a gesture of turning his/her head, which has been estimated by the estimation unit 240 to be suitable as a trigger for a music play process, as a trigger for the music play process based on approval of the user.

(Notification Control Unit 260)

The notification control unit 260 according to the present embodiment has a function to notify the user of the information about the candidate speech/behavior estimated by the estimation unit 240 to be suitable as the trigger for executing the process. According to the above described function of the notification control unit 260 according to the present embodiment, the user can be notified of the information about the speech/behavior which is estimated to have a lower possibility of erroneous ignition of the process. Herein, the speeches/behaviors which can be extracted include a speech/behavior having 0 as the number of times of extraction.

Herein, the information about the speech/behavior applied by the application unit 250 as the trigger for executing the process may include a category, a magnitude, a speed, the number of times, and retention time of the gesture. The magnitude of the speech/behavior refers to, for example, the amount of change in the posture of the user U when the gesture is executed. The number of times of the speech/behavior refers to, for example, the number of times by which the gesture is repeatedly executed. The magnitude of the speech/behavior applied as the trigger by the application unit 250 refers to a threshold value at which the recognition unit 220 recognizes that the trigger has been executed by the user U, for example, a threshold value of the amount of change in the posture of the user U in a case in which the gesture is executed. The information about the candidate speech/behavior refers to the information about the speech/behavior estimated as the candidate speech/behavior by the estimation unit 240.

The notification control unit 260 may notify the user U of, for example, the difference between the speed of the speech/behavior recognized by the recognition unit 220 and the speed of the speech/behavior applied as the trigger by the application unit 250.

Herein, the information about the speech/behavior applied by the application unit 250 as the trigger for executing the process may include a category, a magnitude, a speed, the number of times, and retention time of the gesture. The notification control unit 260 may notify the user U of, for example, the difference between the speed of the speech/behavior recognized by the recognition unit 220 and the speed of the speech/behavior applied as the trigger by the application unit 250.

The notification control unit 260 according to the present embodiment may notify the user of an inquiry whether or not the execution of the above described candidate speech/behavior is to be applied as the trigger for executing the process. According to the function, each user can operate the device by using the speech/behavior having a low possibility of erroneous ignition of the process.

(Process Control Unit 270)

The process control unit 270 according to the present embodiment causes the information processing terminal 10 to execute the process corresponding to the speech/behavior based on the speech/behavior of the user recognized by the recognition unit 220.

Hereinabove, the functional configuration example of the information processing server 20 according to the present embodiment has been explained. Note that the above described functional configuration explained by using FIG. 8 is merely an example, and the functional configuration of the information processing server 20 according to the present embodiment is not limited to that example. For example, the information processing server 20 is not necessarily required to be provided with all the components illustrated in FIG. 8. The recognition unit 220, the behavior-log accumulation unit 230, the estimation unit 240, the application unit 250, and the process control unit 270 may be provided in another device(s), which is different from the information processing server 20. The functional configuration of the information processing server 20 according to the present embodiment can be flexibly changed depending on specifications and/or operation.

<<1.6. Specific Examples of Inquiry Notification about Application>>

Figure 9:
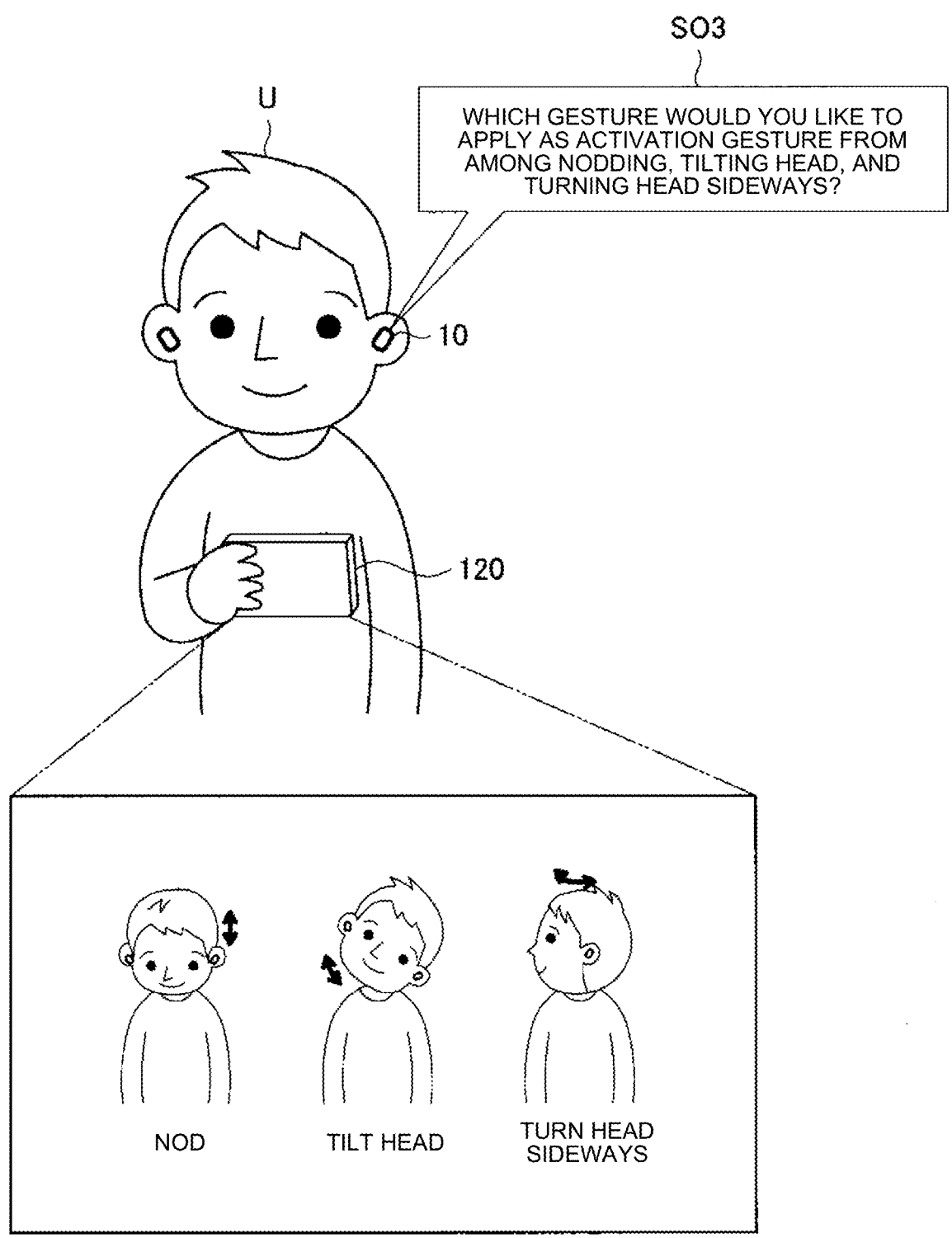
FIG. 9 is a drawing illustrating an example of a case in which a plurality of gestures have been estimated to be suitable as a trigger according to the present embodiment.

Next, control or operation of the information processing server 20 according to the present embodiment will be explained in detail with specific examples. In the above description, the case in which the estimated candidate speech/behavior is one type has been mainly explained. However, according to the estimation unit 240 according to the present embodiment, a plurality of candidate speeches/behaviors may be estimated. For example, FIG. 9 is a drawing illustrating an example of a case in which a plurality of gestures have been estimated to be suitable as the trigger according to the present embodiment. FIG. 9 illustrates the user U wearing the information processing terminal 10 and holding the display unit 120. Herein, the notification control unit 260 according to the present embodiment can notify the user U of an inquiry asking which candidate speech/behavior is to be applied as the trigger among a plurality of candidate speeches/behaviors, which have been estimated by the estimation unit 240 to be suitable as the trigger for executing the process, via the information processing terminal 10 or the display unit 120 realized by a smartphone.

Hereinafter, specific explanations will be given. The notification control unit 260 according to the present embodiment causes the voice output unit 130 to output the categories of the plurality of estimated candidate speeches/behaviors and the voice that inquires asking which candidate speech/behavior is to be applied. The notification control unit 260 according to the present embodiment may cause the display unit 120 to display the information about the candidate speeches/behaviors.

In the example illustrated in FIG. 9, the notification control unit 260 according to the present embodiment causes the voice output unit 130 to output a system speech SO3 which urges selection of the candidate speech/behavior to be applied as the trigger. The notification control unit 260 causes the display unit 120 to display the information about gestures "nodding", "tilting the head", and "turning the head sideways" such as character information and illustrations of the gestures as an example of the system speech SO3.

In this manner, according to the notification control unit 260 according to the present embodiment, the user can select the candidate speech/behavior, which is to be applied as the trigger for executing the process, depending on the situation and preference of each user.

Note that, if the numbers of times of the plurality of extracted speeches/behaviors are equivalent, the estimation unit 240 may estimate the plurality of extracted speeches/behaviors to be suitable as the trigger for executing the process.

Figure 10:
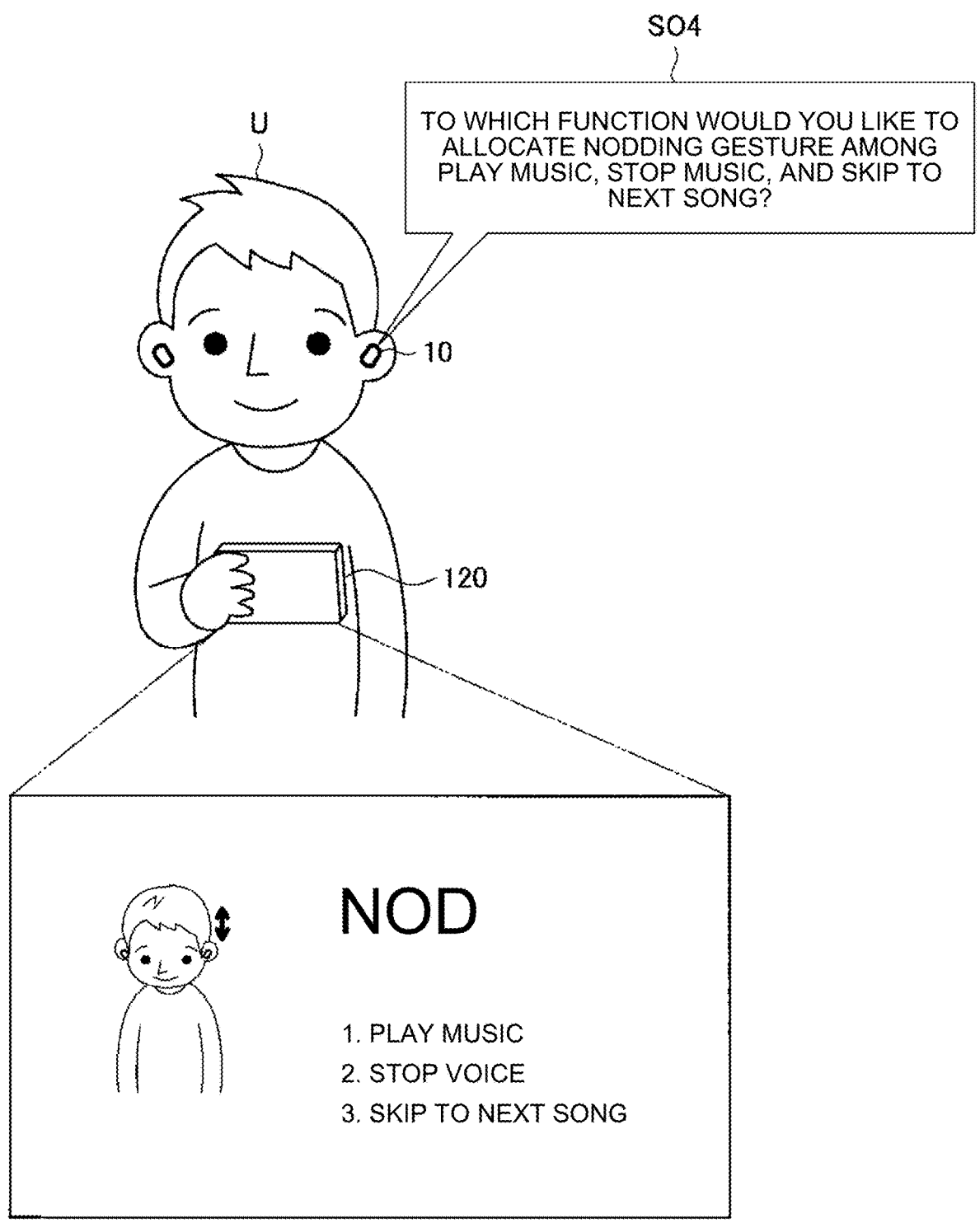
FIG. 10 is a drawing illustrating an example of a case in which an inquiry is made to ask to which process a candidate speech/behavior according to the present embodiment is to be allocated among a plurality of processes.

The above description has mainly explained about the case which presents one type of the process to which the candidate speech/behavior estimated to be suitable as the trigger for executing the process is allocated. However, a plurality of allocated processes may be presented. For example, FIG. 10 is a drawing illustrating an example of a case in which an inquiry is made to ask to which process the candidate speech/behavior according to the present embodiment is to be allocated among a plurality of processes. FIG. 10 illustrates the user U wearing the information processing terminal 10 and holding the display unit 120. Herein, the notification control unit 260 according to the present embodiment can notify the user U of the inquiry asking to which trigger for executing a process among a plurality of processes the candidate speech/behavior, which has been estimated by the estimation unit 240 to be suitable as triggers for executing the processes, is to be applied via the information processing terminal 10 or the display unit 120.

Hereinafter, specific explanations will be given. The notification control unit 260 according to the present embodiment causes the voice output unit 130 to output a voice for notification of information such as the category of the candidate speech/behavior and the name of the process. Moreover, the notification control unit 260 causes the voice output unit 130 to output a voice of an inquiry asking to which trigger for a process the candidate speech/behavior is to be applied. Moreover, the notification control unit 260 may give a notification by causing the display unit 120 to display the information as described above.

In the example illustrated in FIG. 10, the notification control unit 260 according to the present embodiment causes the information processing terminal 10 to execute a system speech SO4 for urging the user to apply the candidate speech/behavior to the trigger of any of processes. Moreover, the notification control unit 260 causes the display unit 120 to display character information and an illustration of a "nodding" gesture and names of the processes: "play music", "stop music", and "skip to the next song".

In this manner, according to the notification control unit 260 according to the present embodiment, the user can select the process to which the candidate speech/behavior is applied as the trigger depending on the situation and preference of each user.

The above description has mainly explained about the case of the process until the candidate speech/behavior is applied as the trigger for executing the process. On the other hand, if the process is erroneously ignited after the candidate speech/behavior is applied as the trigger for executing the process, the magnitude of the speech/behavior may be changed. Note that the above described operation history may include information about whether or not operations corresponding to the gesture have been erroneously ignited, and the magnitude of the speech/behavior, which has been applied by the application unit 250 as the trigger for executing the process, may be changed based on the information about the erroneous ignition. Note that the information of the erroneous ignition is acquired, for example, when the estimation unit 240 extracts, from the behavior log, the operation history of the cancelling operation of the process carried out by the user after the speech/behavior is executed.

Figure 11:
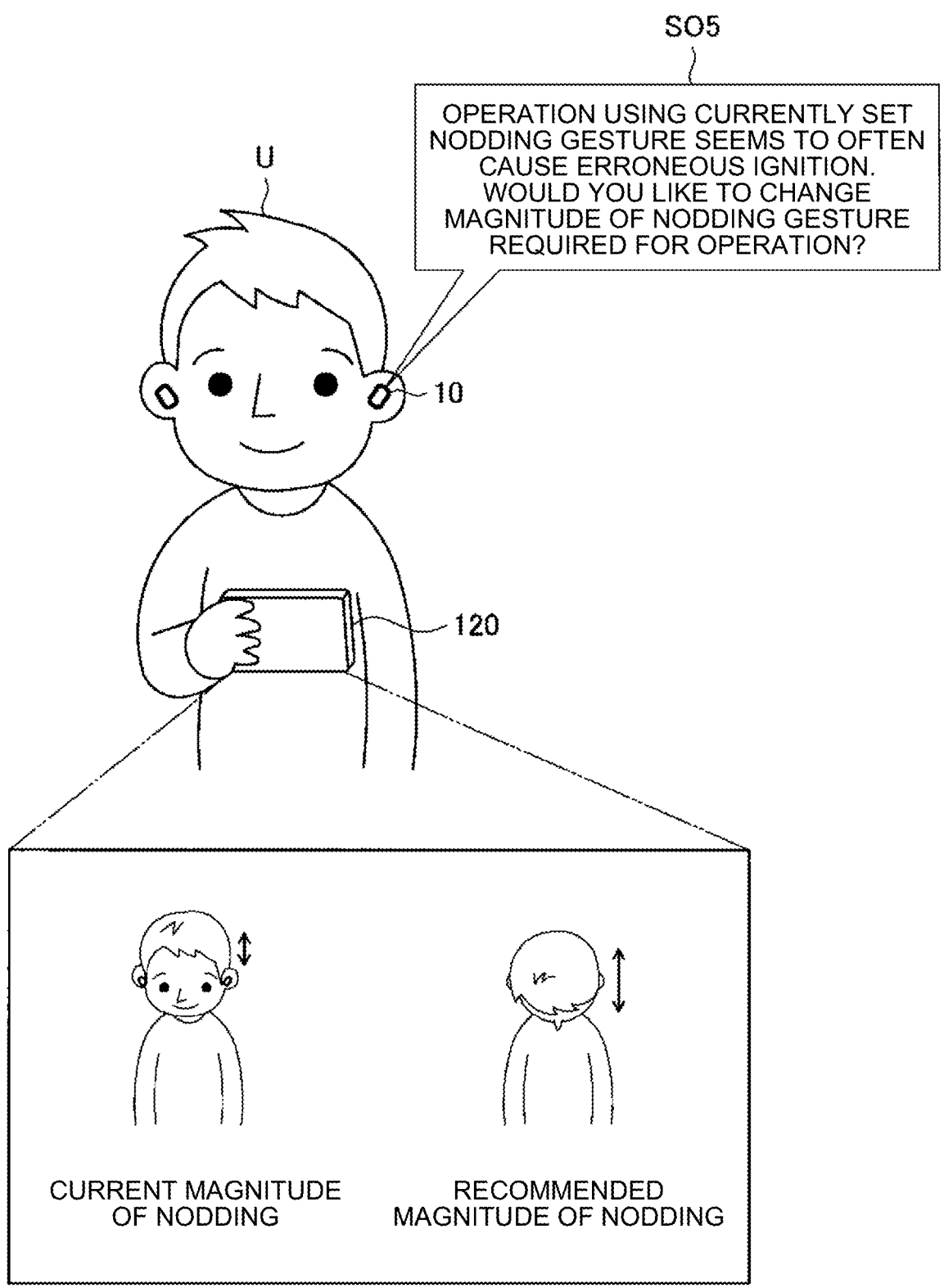
FIG. 11 is a drawing illustrating an example of a case in which the user is notified of a magnitude change of a gesture which has been applied by an application unit 250 as the trigger according to the present embodiment.

For example, FIG. 11 is a drawing illustrating an example of a case in which the user is notified of a magnitude change of the gesture which has been applied by the application unit 250 as the trigger according to the present embodiment. FIG. 11 illustrates the user U wearing the information processing terminal 10 and holding the display unit 120. Herein, if the estimation unit 240 estimates an erroneous ignition of the process by a speech/behavior, the notification control unit 260 according to the present embodiment can notify the user U of an inquiry whether or not the magnitude of the speech/behavior of the trigger is to be changed via the information processing terminal 10 or the display unit 120.

Hereinafter, specific explanations will be given. The notification control unit 260 according to the present embodiment causes the voice output unit 130 to output the information about the speech/behavior, which has been applied by the application unit 250 as the trigger for executing the process, and the voice inquiring whether or not the magnitude of the speech/behavior is to be changed. Herein, the notification control unit 260 according to the present embodiment may notify the user of the category and the magnitude of the speech/behavior, which has been applied as the trigger, by displaying the category and the magnitude by the display unit 120.

In the example illustrated in FIG. 11, the notification control unit 260 according to the present embodiment causes the information processing terminal 10 to execute a system speech SO5 for notifying the user of the inquiry whether or not the above described magnitude is to be changed. Moreover, the notification control unit 260 causes the display unit 120 to display the currently applied magnitude and a recommended magnitude about the information about the gesture applied by the application unit 250 as the trigger such as a "nodding" gesture applied by the application unit 250 as the trigger.

In this manner, according to the notification control unit 260 according to the present embodiment, even in the case in which the category of the trigger applied as the trigger is not changed, each user can prevent erroneous ignition of the process. According to this function, when the magnitude of the speech/behavior applied as the trigger is to be changed, each user can operate the device without changing a usage feeling since an operational feeling does not largely change for the user compared with a case in which the category is changed.

Figure 12:
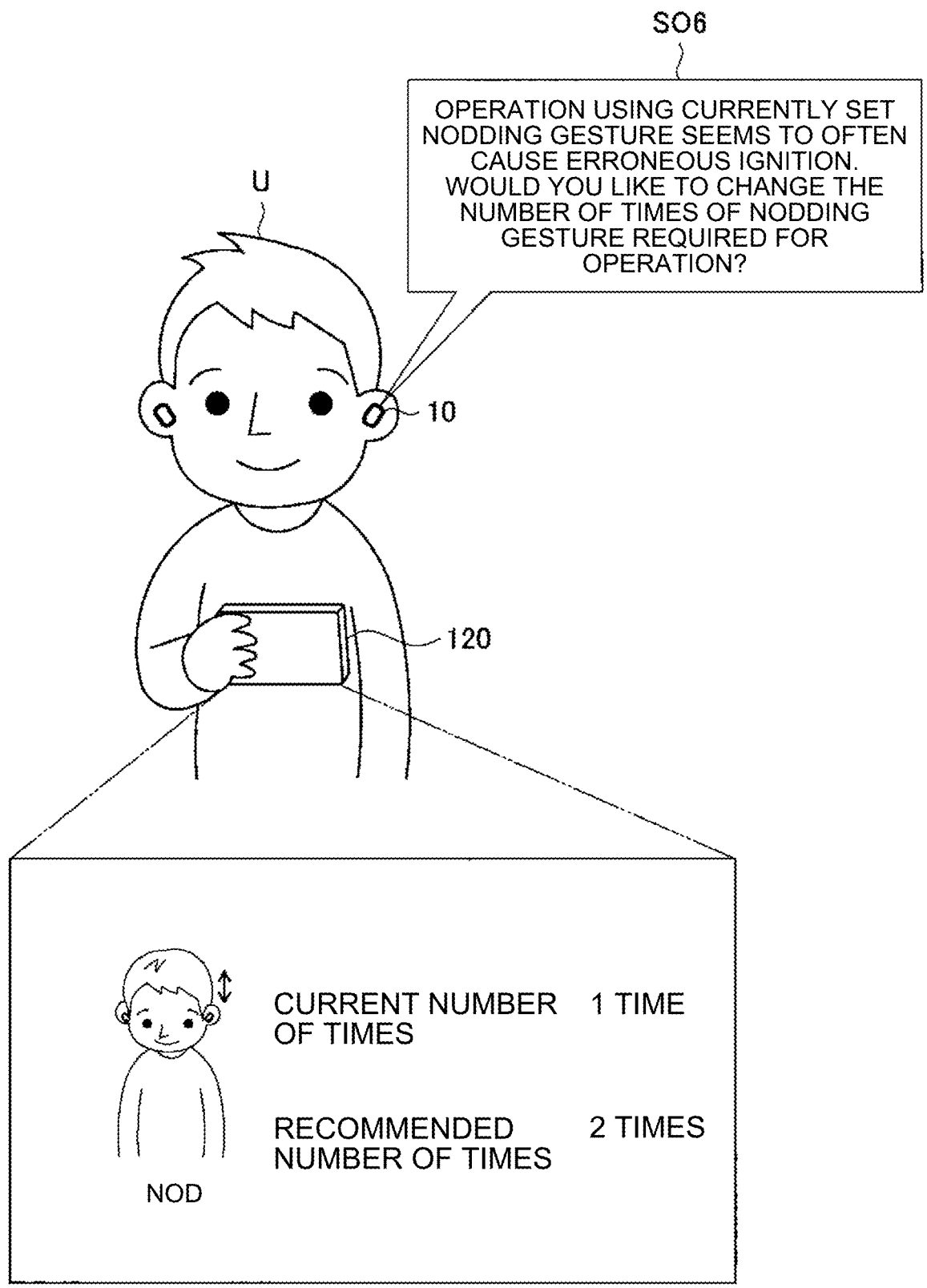
FIG. 12 is a drawing illustrating an example of a case in which the user is notified of a change in the number of times of the gesture which has been applied by the application unit 250 as the trigger according to the present embodiment.

Meanwhile, based on the above described information of the erroneous ignition, the number of times of the speech/behavior applied by the application unit 250 as the trigger for executing the process may be changed. For example, FIG. 12 is a drawing illustrating an example of a case in which the user is notified of a change in the number of times of the gesture which has been applied by the application unit 250 as the trigger according to the present embodiment. FIG. 12 illustrates the user U wearing the information processing terminal 10 and holding the display unit 120. Herein, if the estimation unit 240 estimates an erroneous ignition of the speech/behavior applied by the application unit 250 as the trigger for the process, the notification control unit 260 according to the present embodiment can notify the user U of an inquiry whether or not the number of times of the speech/behavior of the trigger is to be changed via the information processing terminal 10 or the display unit 120.

Hereinafter, specific explanations will be given. The notification control unit 260 according to the present embodiment causes the voice output unit 130 to output the information about the speech/behavior, which has been applied by the application unit 250 as the trigger, such as the category and the number of times of the gesture and the voice inquiring whether or not the number of times of the speech/behavior is to be changed. Herein, the notification control unit 260 according to the present embodiment may notify the user of the information about the speech/behavior, which has been applied as the trigger, such as the category and the number of times of the gesture by displaying the information by the display unit 120.

In the example illustrated in FIG. 12, the notification control unit 260 according to the present embodiment causes the information processing terminal 10 to execute a system speech SO6 for notifying the user of the inquiry whether or not the above described number of times is to be changed. Moreover, the notification control unit 260 causes the display unit 120 to display the currently applied number of times and a recommended number of times about the information about the gesture applied by the application unit 250 as the trigger such as a "nodding" gesture applied by the application unit 250 as the trigger.

In this manner, according to the notification control unit 260 according to the present embodiment, even in the case in which the category of the speech/behavior applied as the trigger is not changed, each user can prevent erroneous ignition of the process. According to this function, when the number of times of the speech/behavior is to be changed, each user can operate the device without changing a usage feeling since an operational feeling does not largely change for the user compared with a case in which the category is changed.

The above description has mainly explained about the case in which the estimation unit 240 estimates that a single speech/behavior is suitable as the trigger for executing the process. However, the candidate speech/behavior may be a combination of a plurality of speeches/behaviors. For example, FIG. 13 is a drawing illustrating an example of a case in which the user is notified of the information about a combination of speeches/behaviors applied as the trigger according to the present embodiment. The upper side of FIG.

13 illustrates the user U wearing the information processing terminal 10 and holding the display unit 120. Meanwhile, the lower side of FIG. 13 illustrates the user U executing a gesture of turning his/her head sideways.

In the upper side of FIG. 13, the notification control unit 260 according to the present embodiment notifies the user of information about a first speech/behavior among a combination of speeches/behaviors applied by the application unit 250 as the trigger for executing the process. Herein, the first speech/behavior refers to the speech/behavior applied by the application unit 250 to be executed first among the combination of the speeches/behaviors. Hereinafter, specific explanations will be given. The notification control unit 260 according to the present embodiment causes the voice output unit 130 to output a voice which notifies the user of guidance of the category of the first speech/behavior. Herein, the notification control unit 260 according to the present embodiment may notify the user by causing the display unit 120 to display the category of the first speech/behavior and/or an illustration corresponding to the category.

In the example of the upper side of FIG. 13, the notification control unit 260 according to the present embodiment causes the information processing terminal 10 to execute a system speech SO7 for notifying the user U of the information about an action "turning the head sideways" to be executed first by the user. Moreover, the notification control unit 260 causes the display unit 120 to display information about the action "turning the head sideways" such as the category and illustration of the action.

Meanwhile, in the lower side of FIG. 13, the notification control unit 260 according to the present embodiment notifies the user of information about a second speech/behavior among the combination of speeches/behaviors applied by the application unit 250 as the trigger for executing the process. Herein, the second speech/behavior refers to the speech/behavior applied by the application unit 250 to be executed second among the combination of the speeches/behaviors. Hereinafter, specific explanations will be given. If the recognition unit 220 recognizes the first speech/behavior, the notification control unit 260 according to the present embodiment causes the voice output unit 130 to output a voice which notifies the user of guidance of the category of the second speech/behavior. Herein, the notification control unit 260 according to the present embodiment may notify the user of the information about the second speech/behavior such as the category and illustration of the gesture by displaying the information by the display unit 120.

In the example of the lower side of FIG. 13, if the recognition unit 220 recognizes the gesture "turning the head sideways", the notification control unit 260 according to the present embodiment causes the information processing terminal 10 to execute a system speech SO8 for notifying the user U of the information about the gesture to be executed second by the user U. Moreover, the notification control unit 260 causes the display unit 120 to display information about a "nodding" gesture such as the category and/or illustration of the gesture.

In this manner, according to the notification control unit 260 according to the present embodiment, the user is enabled to understand the information about the speech/behavior to be executed next among the combination of the speeches/behaviors applied as the trigger. According to this function, the user is enabled to easily learn operation of the device by the combination of the speeches/behaviors.

Figure 14:
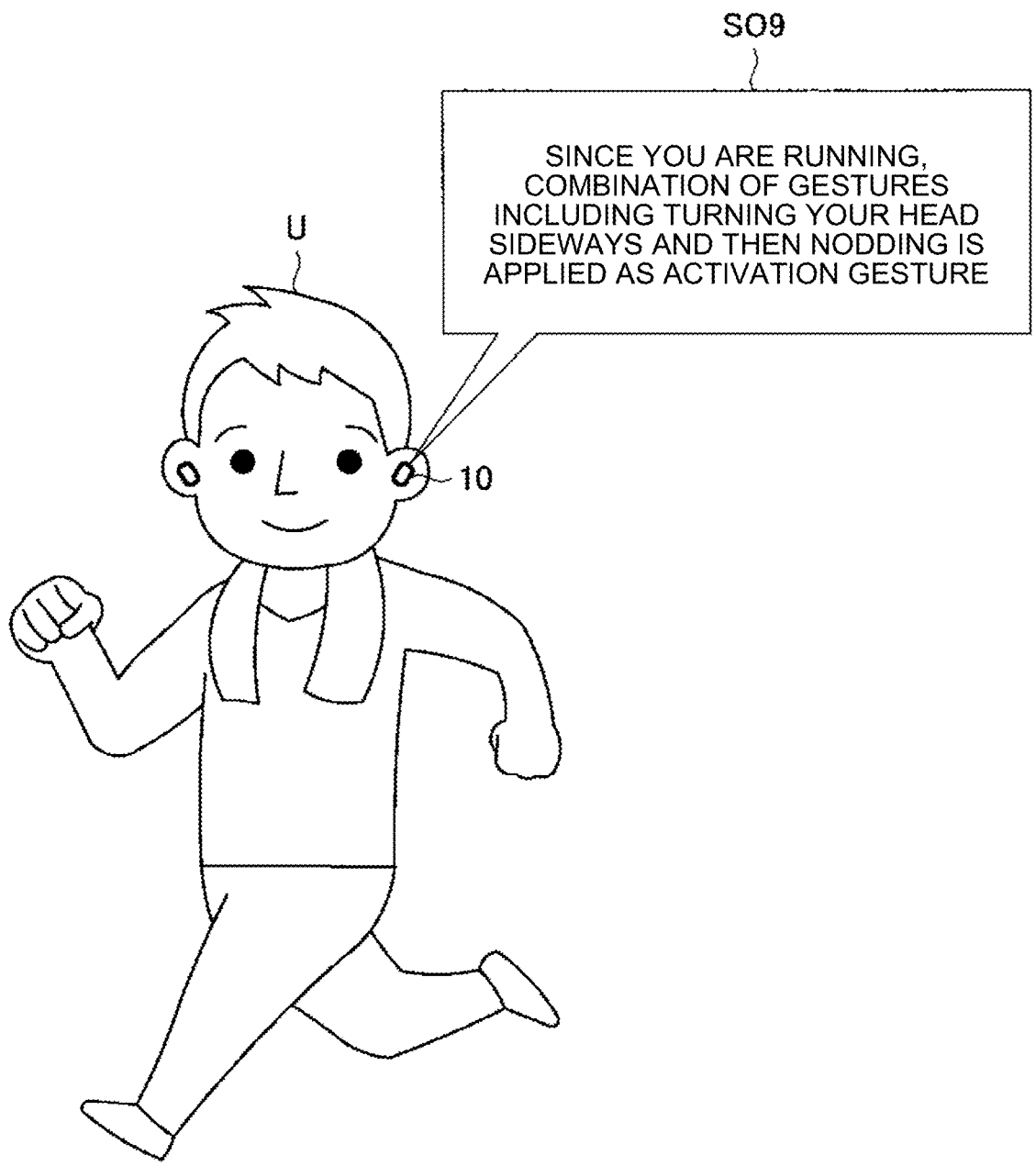
FIG. 14 is a drawing illustrating an example of a case in which the user is notified of information about a gesture applied by the application unit 250 as the trigger for executing the process depending on the situation of the user according to the present embodiment.

The above description has mainly explained about the case in which the estimation unit 240 carries out estimation when the user is not doing a particular behavior. However, the candidate speech/behavior may be estimated depending on a predetermined situation of the user. For example, FIG. 14 is a drawing illustrating an example of a case in which the user is notified of the information about a gesture applied by the application unit 250 as the trigger for executing the process depending on the situation of the user according to the present embodiment. FIG. 14 illustrates the user U wearing the information processing terminal 10 and running. Depending on a predetermined situation of the user U recognized by the recognition unit 220 according to the present embodiment, the notification control unit 260 according to the present embodiment can notify the user U of the information about a candidate speech/behavior estimated to be suitable as the trigger for executing the process in the situation via the information processing terminal 10.

Hereinafter, specific explanations will be given. The notification control unit 260 according to the present embodiment causes the voice output unit 130 to output a voice which notifies the user of guidance about information of the candidate speech/behavior. In the case of the example illustrated in FIG. 14, in a situation in which the user U is running, the estimation unit 240 estimates that erroneous ignitions are increased if only the "nodding" gesture is used as the activation gesture. Therefore, the information processing terminal 10 notifies the user U of a fact that a combination of a "turning head sideways" gesture and a "nodding" gesture, which has been estimated by the estimation unit 240 to be suitable as the activation gesture, has been applied as the activation gesture.

Also, depending on a predetermined situation(s) of the user U, the notification control unit 260 according to the present embodiment may notify the user U of an inquiry whether or not the execution of a candidate speech/behavior estimated from the behavior log is to be applied as the trigger for executing the process.

In this manner, according to the notification control unit 260 according to the present embodiment, the user can change the speech/behavior, which is to be applied as the trigger for executing the process, depending on the predetermined situation(s). According to this function, erroneous ignitions of the process can be more effectively prevented in each of the situations.

Figure 15:
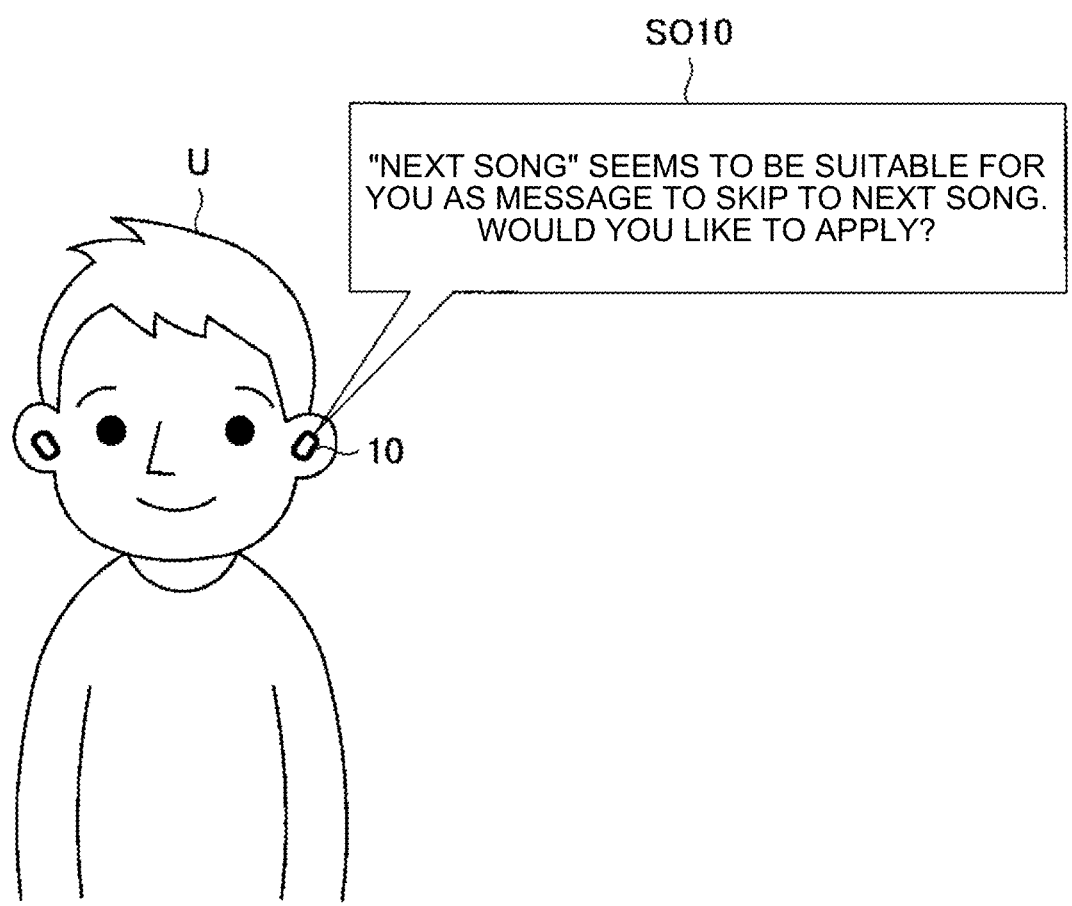
FIG. 15 is a drawing for explaining an example of notification according to the present embodiment.

In the above description, the examples in which actions are used as the trigger for executing the process have been described. However, the candidate speeches/behaviors include speeches of predetermined phrases. For example, FIG. 15 is a drawing for explaining an example of notification according to the present embodiment. FIG. 15 illustrates the user U wearing the information processing terminal 10. Herein, the information processing terminal 10 can notify the user U of the inquiry whether or not a speech of a phrase, which has been estimated by the estimation unit 240 to be suitable as the trigger for executing the process, is to be applied as the trigger.

Hereinafter, specific explanations will be given. The notification control unit 260 according to the present embodiment causes the voice output unit 130 to output a voice which notifies the user of the information about the speech of the phrase and a message whether or not the speech of the phrase is to be applied. Herein, the notification control unit 260 may cause the display unit 120 to display the information about the speech of the phrase.

In the case of the example illustrated in FIG. 15, the notification control unit 260 according to the present embodiment causes the information processing terminal 10 to execute a system speech 5010 for notifying the user of an inquiry whether or not speaking "next song" is to be applied as the trigger of a skip process of music play.

In this manner, according to the information processing terminal 10 and the information processing server 20 according to the present embodiment, based on the characteristics of the speeches/behaviors of the user, the user can be notified of the information about the candidate speech/behavior suitable as the trigger for executing the process. According to this function, execution of the process in a case in which the user does not intend to execute the process, in other words, occurrence of an erroneous ignition can be efficiently prevented, and the user is enabled to understand the fact that the possibility of occurrence of erroneous ignitions is lowered thereafter by notifying each user of the inclination of the behavior of himself/herself.

<<1.7. Flow of Control>>

Figure 16:
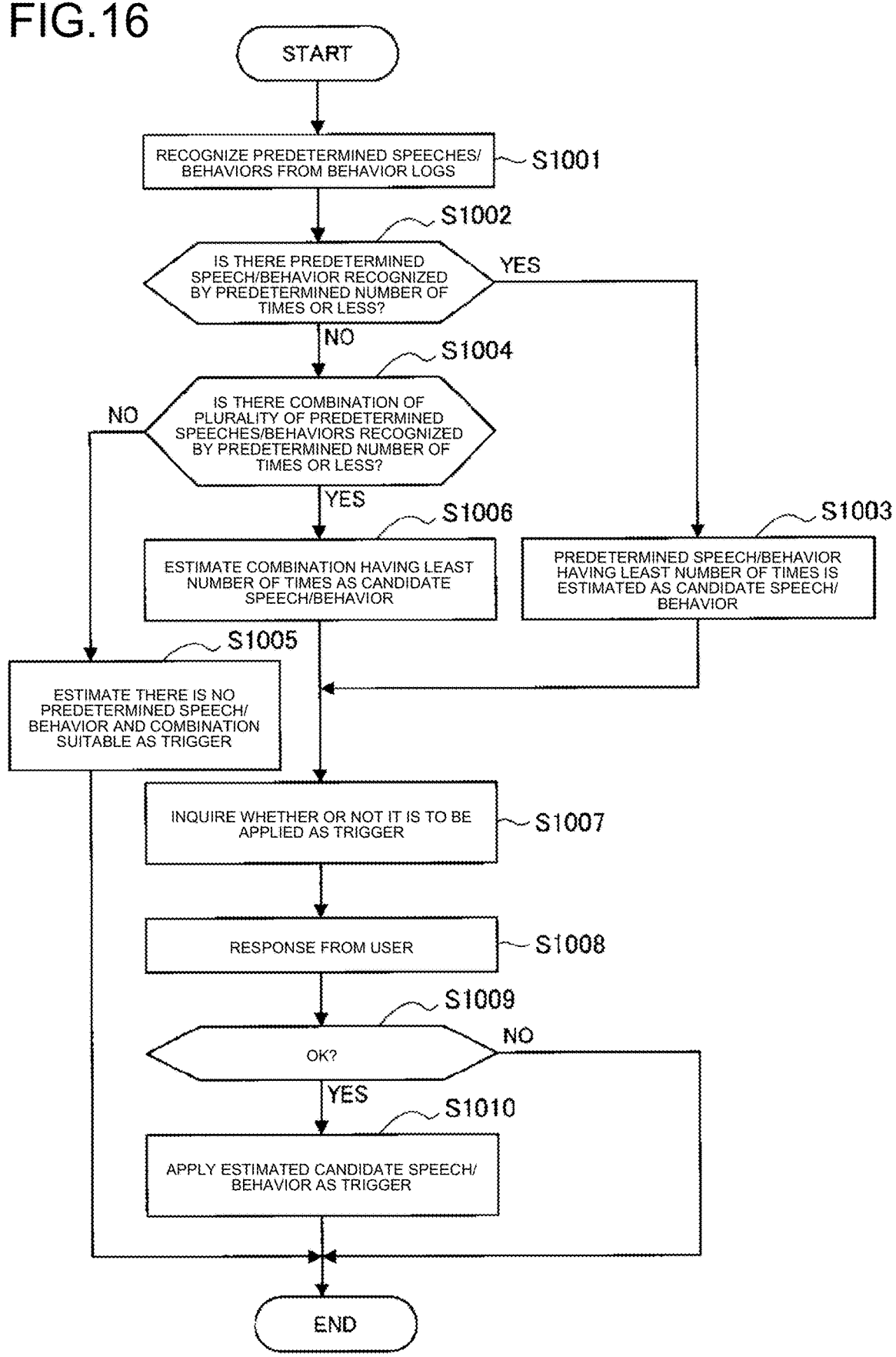
FIG. 16 is a flow chart illustrating an example of a flow of estimating and applying a candidate speech/behavior suitable as the trigger according to the present embodiment.

Next, a flow of operation about the candidate speech/behavior by the information processing server 20 according to the present embodiment will be explained in detail. FIG. 16 is a flow chart illustrating an example of a flow of estimating and applying a candidate speech/behavior suitable as the trigger according to the present embodiment.

With reference to FIG. 16, first, the estimation unit 240 of the information processing server 20 extracts information about a predetermined speech(es)/behavior(s) as a recognition result R from behavior logs accumulated in the behavior-log accumulation unit 230 (S1001).

Next, based on the recognition result R, the estimation unit 240 determines whether or not a predetermined speech/behavior having the number of times of recognition by the recognition unit 220 equal to or less than a predetermined number of times is present among the predetermined speeches/behaviors (S1002). The predetermined speech/behavior having the number of times of recognition by the recognition unit 220 equal to or less than the predetermined number of times is present (S1002: YES), the predetermined speech/behavior is estimated as a candidate speech/behavior suitable as a trigger for executing a process (S1003). Note that, if a plurality of types of the predetermined speeches/behaviors estimated as the candidate speeches/behaviors are present, for example, the candidate speech/behavior having the least number of times of recognition by the recognition unit 220 among the plurality of candidate speeches/behaviors may be estimated by the estimation unit 240 as the candidate speech/behavior suitable as the trigger (S1003).

On the other hand, if the predetermined speech/behavior having the number of times of recognition by the recognition unit 220 equal to or less than the predetermined number of times is not present (S1002: NO), the estimation unit 240 determines whether or not a combination of the predetermined speeches/behaviors having the number of times of recognition by the recognition unit 220 equal to or less than the predetermined number of times is present based on the numbers of times of the predetermined speeches/behaviors recognized by the recognition unit 220 and combinations of the predetermined speeches/behaviors (S1004). Herein, if the combination of the predetermined speeches/behaviors having the number of times of recognition by the recognition unit 220 equal to or less than the predetermined number of times is present (S1004: YES), the combination of the predetermined speeches/behaviors is estimated as the candidate speech/behavior suitable as the trigger (S1006). Note that, if a plurality of types of the combinations of the predetermined speeches/behaviors estimated to be suitable as the trigger are present, the estimation unit 240 may estimate the combination of the predetermined speeches/behaviors having the least number of times of recognition by the recognition unit 220 among the plurality of combinations of the predetermined speeches/behaviors as the candidate speech/behavior (S1006).

On the other hand, if the combination of the predetermined speeches/behaviors having the number of times of recognition by the recognition unit 220 equal to or less than the predetermined times is not present (S1004: NO), the estimation unit 240 determines that the predetermined speech/behavior and the combination of the predetermined speeches/behaviors estimated to be suitable as the trigger are not present (S1005), and the information processing server 20 terminates the operation. Note that, in this process, the estimation unit 240 may estimate that an equipment operation such as pressing a button, a touch operation, or the like is suitable as the trigger (S1005).

After execution of step S1003 or step S1006, the notification control unit 260 notifies the user of an inquiry whether or not the predetermined speech/behavior or the combination of the predetermined speeches/behaviors estimated by the estimation unit 240 is to be applied as the trigger for executing the process (S1007). Then, the information processing server 20 receives a response to the inquiry from the user via the information processing terminal 10 (S1008).

Then, the information processing server 20 determines the contents of the response received from the user (S1009). Herein, if the contents of the response are approval of the inquiry (S1009: YES), the application unit 250 applies the candidate speech/behavior, which has been estimated in step S1003 or S1006, as the trigger for executing the process (S1010), and the information processing server 20 terminates the operation. On the other hand, if the contents of the response are a request not to apply the candidate speech/behavior as the trigger (S1009: NO), the information processing server 20 terminates the operation.

Figure 17:
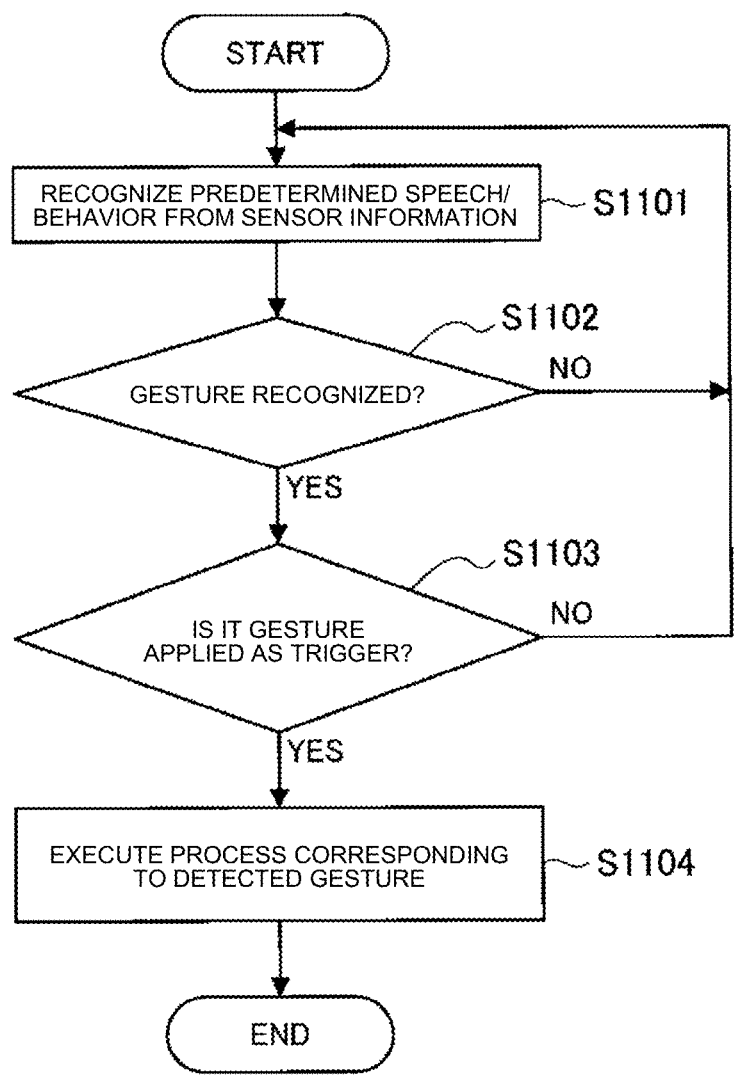
FIG. 17 is a flow chart illustrating an example of the flow of control in gesture processing according to the present embodiment.

Next, an example of the flow of control in processing of the speech/behavior according to the present embodiment will be explained in detail. FIG. 17 is a flow chart illustrating an example of the flow of control in gesture processing according to the present embodiment.

With reference to FIG. 17, first, the recognition unit 220 receives sensor information, which has been collected by the sensor unit 160, via the communication unit 210 and recognizes the predetermined speech/behavior (S1101).

Then, the recognition unit 220 determines whether or not the predetermined speech/behavior recognized in step S1101 is a gesture (S1102). If the predetermined speech/behavior is a gesture (S1102: YES), whether or not the gesture is the gesture applied by the application unit 250 as the trigger for executing the process is determined (S1103). Herein, if the predetermined speech/behavior is not a gesture (S1102: NO), the information processing server 20 returns to step S1101.

On the other hand, if the recognized gesture is the gesture applied by the application unit 250 as the trigger (S1103: YES), the process control unit 270 controls execution of the process corresponding to the gesture, and the information processing server 20 terminates the operation. On the other hand, if the recognized gesture is not the gesture applied by the application unit 250 as the trigger (S1103: NO), the information processing server 20 returns to step S1101.

2. Hardware Configuration Example

Figure 18:
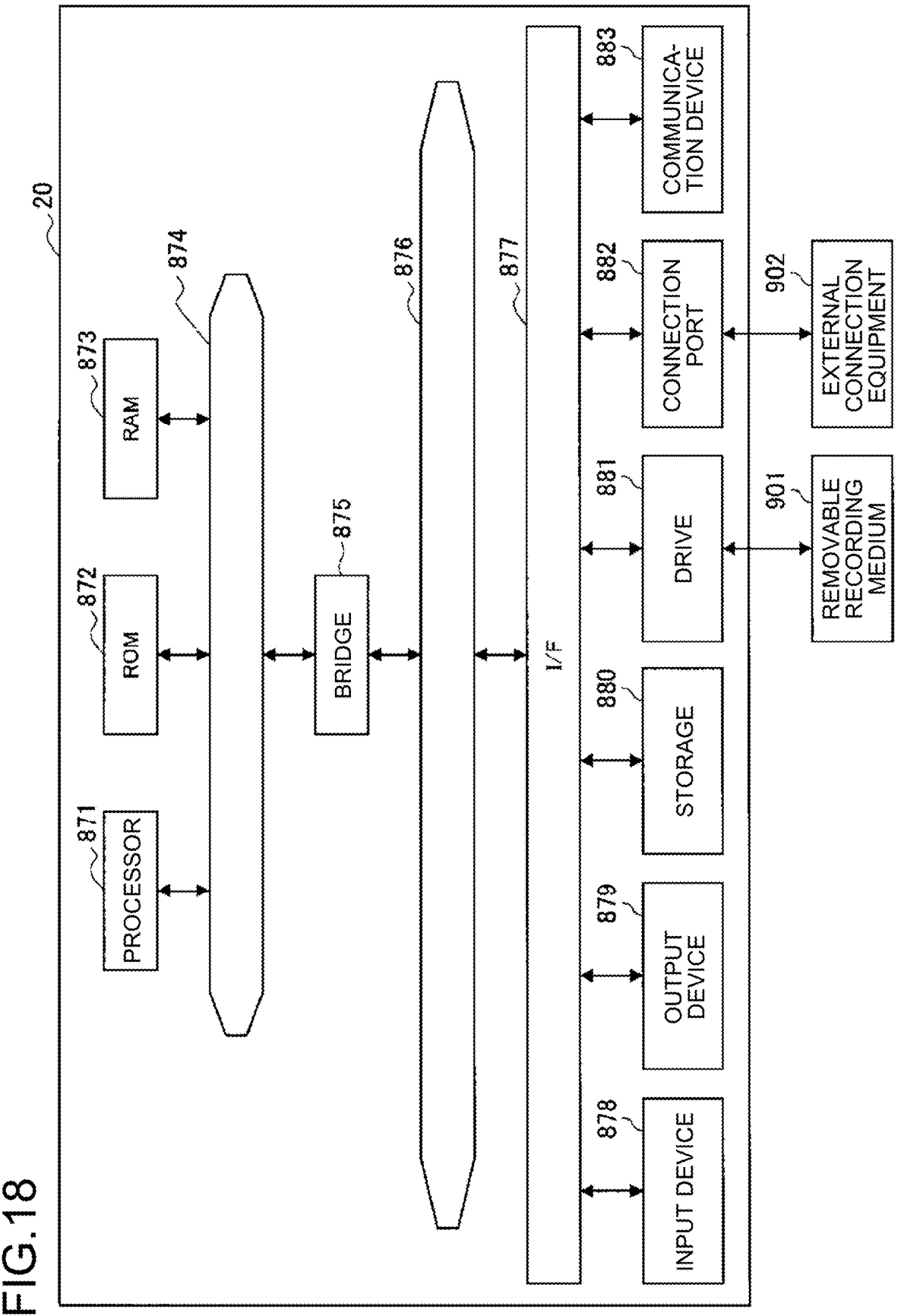
FIG. 18 is a block diagram illustrating a hardware configuration example of the information processing server 20 according to an embodiment of the present disclosure.

Next, a hardware configuration example of the information processing server 20 according to an embodiment of the present disclosure will be explained. FIG. 18 is a block diagram illustrating the hardware configuration example of the information processing server 20 according to the embodiment of the present disclosure. With reference to FIG. 18, the information processing server 20 has, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated herein is an example, and some of the constituent elements may be omitted. Also, a constituent element(s) other than the constituent elements illustrated herein may be included.

(Processor 871)

The processor 871 functions, for example, as an arithmetic processing device or a control device and controls all of or part of operations of the constituent elements based on various programs recorded in the ROM 872, the RAM 873, the storage 880, or a removable recording medium 901.

(ROM872, RAM873)

The ROM 872 is a means for storing, for example, programs to be read by the processor 871 and data to be used in computing. In the RAM 873, for example, programs to be read by the processor 871, various parameters which are appropriately changed when the programs are executed, and so on are stored temporarily or permanently.

(Host Bus 874, Bridge 875, External Bus 876, Interface 877)

The processor 871, the ROM 872, and the RAM 873 are mutually connected, for example, via the host bus 874 which can carry out high-speed data transmission. On the other hand, the host bus 874 is connected to, for example, the external bus 876, which has a comparatively low data transmission speed, via the bridge 875. Moreover, the external bus 876 is connected to various constituent elements via the interface 877.

(Input Device 878)

As the input device 878, for example, a mouse, a keyboard, a touch panel, a button, a switch, and a lever are used. Furthermore, a remote controller (hereinafter, remote) which can transmit control signals by using infrared rays or other radio waves is used as the input device 878 in some cases. Moreover, the input device 878 includes a voice input device such as a microphone.

(Output Device 879)

The output device 879 is, for example, a device such as: a display device of a Cathode Ray Tube (CRT), an LCD, organic electroluminescence (EL), or the like; an audio output device such as a speaker or a headphone; a printer; a mobile phone; or a fax machine which can notify a user of acquired information visually or auditorily. Also, the output device 879 according to the present disclosure includes any of various vibration devices which can output tactile sensations.

(Storage 880)

The storage 880 is a device for storing various data. As the storage 880, for example, a magnetic storage device such as a hard disk drive (HDD), a semiconductor storage device, an optical storage device, or a magnetooptical storage device is used.

(Drive 881)

The drive 881 is, for example, a device which reads information recorded in the removable recording medium 901 such as a magnetic disk, an optical disk, a magnetooptical disk, or a semiconductor memory and writes information to the removable recording medium 901.

(Removable Recording Medium 901)

The removable recording medium 901 is, for example, any of DVD media, Blu-ray (registered trademark) media, HD DVD media, and various semiconductor storage media. As a matter of course, the removable recording medium 901 may be, for example, an integrated circuit (IC) card equipped with a non-contact-type IC chip or electronic equipment.

(Connection Port 882)

The connection port 882 is, for example, a port for connecting external connection equipment 902 such as a Universal Serial Bus (USB) port, an IEEE 1394 port, a Small Computer System Interface (SCSI), a RS-232C port, or an optical audio terminal.

(External Connection Equipment 902)

The external connection equipment 902 is, for example, a printer, a portable music player, a digital camera, a digital video camera, or an IC recorder.

(Communication Device 883)

The communication device 883 is a communication device for connecting to a network and is, for example, a communication card for a wired or wireless local area network (LAN), Bluetooth (registered trademark), or a Wireless USB (WUSB); a router for optical communication, a router for Asymmetric Digital Subscriber Line (ADSL), or a modem for various communication.

3. Conclusion

As explained above, the information processing terminal 10 and the information processing server 20 according to the embodiment of the present disclosure have the function to notify the user of the information about the speech/behavior which has been estimated for each user to reduce the possibility of erroneous ignition of the process. Moreover, a characteristic of the information processing terminal 10 and the information processing server 20 in this process is notifying the user of the inquiry whether or not the speech/behavior is to be applied as the trigger for executing the process. According to this configuration, the erroneous ignition of the process of the device caused by the characteristics of the speeches/behaviors of the user can be efficiently prevented.

Hereinabove, the preferred embodiments of the present disclosure have been explained in detail with reference to accompanying drawings. However, the technical scope of the present disclosure is not limited to these examples. It is obvious that a person ordinarily skilled in the art of the present disclosure can conceive of various change examples or modification examples within the scope of the technical idea described in claims, and, as a matter of course, it is understood that these examples also belong to the technical scope of the present disclosure.

Meanwhile, the effects described in the present description are merely explanatory or exemplary, but not limitative. In other words, the techniques according to the present disclosure may exert other effects which are obvious to those skilled in the art according to the description of the present description together with the above described effects or in place of the above described effects.

Moreover, the steps about the processes of the information processing server 20 of the present description are not necessarily required to be processed in the time series along the order described in the flow chart. For example, the steps about the processes of the information processing server 20 may be processed in an order different from the order described in the flow charts or may be processed in parallel.

Note that configurations as described below also belong to the technical scope of the present disclosure.

(1)

An information processing device comprising
a notification control unit configured to notify a user of information about a candidate speech/behavior estimated to be suitable as a trigger for executing a predetermined process among a plurality of speeches/behaviors extractable from a behavior log of the user, wherein
the notification control unit further notifies the user of an inquiry whether or not execution of the candidate speech/behavior estimated from the behavior log is to be applied as the trigger, and
the candidate speech/behavior is estimated based on a number of times by which the speech/behavior is extracted from the behavior log.

(2)

The information processing device according to (1), wherein
the candidate speech/behavior is the predetermined speech/behavior having the number of times of extraction lower than a predetermined number among the plurality of predetermined speeches/behaviors extracted from the behavior log.

(3)

The information processing device according to (1) or (2), wherein
the trigger includes an activation trigger configured to start an interaction between the user and an agent function.

(4)

The information processing device according to any one of (1) to (3), wherein
the notification control unit notifies the user of an inquiry whether or not the candidate speech/behavior including a combination of a plurality of the predetermined speeches/behaviors is to be applied as the trigger.

(5)

The information processing device according to (4), wherein
the candidate speech/behavior including the combination of the plurality of predetermined speeches/behaviors is estimated to be suitable as the trigger when all of the predetermined speeches/behaviors of the plurality of predetermined speeches/behaviors extracted from the behavior log are recognized by a predetermined number of times or more.

(6)

The information processing device according to any one of (1) to (5), wherein
the notification control unit notifies the user of an inquiry asking which of the candidate speech/behavior is to be applied as the trigger among the plurality of estimated candidate speeches/behaviors.

(7)

The information processing device according to any one of (1) to (6), wherein
the notification control unit notifies the user of an inquiry asking to which of the trigger for executing the predetermined process among the plurality of predetermined processes the estimated candidate speech/behavior is to be applied.

(8)

The information processing device according to any one of (1) to (7), wherein
the notification control unit notifies the user of an inquiry whether or not execution of the estimated candidate speech/behavior is to be applied as the trigger depending on a predetermined situation of the user.

(9)

The information processing device according to any one of (1) to (8), wherein
the information about the candidate speech/behavior includes at least a category of the candidate speech/behavior.

(10)

The information processing device according to any one of (1) to (9), wherein
the information about the candidate speech/behavior includes at least a magnitude of the candidate speech/behavior.

(11)

The information processing device according to (10), wherein
the notification control unit notifies the user whether or not the magnitude of the speech/behavior of the trigger is to be changed when an erroneous ignition of the speech/behavior applied as the trigger is estimated.

(12)

The information processing device according to any one of (1) to (11), wherein
the information about the candidate speech/behavior includes at least the number of times of the candidate speech/behavior.

(13)

The information processing device according to (12), wherein
the notification control unit notifies the user whether or not the number of times of the speech/behavior of the trigger is to be changed when an erroneous ignition of the speech/behavior applied as the trigger is estimated.

(14)

The information processing device according to any one of (1) to (13), wherein
the candidate speech/behavior includes at least one gesture, and
the notification control unit notifies the user of an inquiry whether or not execution of the gesture is to be applied as the trigger.

(15)

The information processing device according to any one of (1) to (14), wherein
the candidate speech/behavior includes at least one speech, and
the notification control unit notifies the user of an inquiry whether or not execution of the speech is to be applied as the trigger.

(16)

The information processing device according to any one of (1) to (15), wherein
the predetermined process is executed by a wearable device.

(17)

The information processing device according to any one of (1) to (16), wherein
the predetermined process is executed by a bearable device.

(18)

The information processing device according to any one of (1) to (17), further comprising
an estimation unit configured to estimate the candidate speech/behavior suitable as the trigger for executing the predetermined process among the plurality of predetermined speeches/behaviors recognized from the behavior log, wherein
the estimation unit estimates the candidate speech/behavior based on the number of times of the speech/behavior extractable from the behavior log.

(19)

An information processing method comprising: by a processor,
notifying a user of information about a candidate speech/behavior estimated to be suitable as a trigger for executing a predetermined process among a plurality of speeches/behaviors extractable from a behavior log of the user; and
further notifying the user of an inquiry whether or not execution of the candidate speech/behavior estimated from the behavior log is to be applied as the trigger, wherein
the candidate speech/behavior is estimated based on a number of times by which the speech/behavior is extracted from the behavior log.

(20)

A program for causing a computer to function as an information processing device comprising
a notification control unit configured to notify a user of information about a candidate speech/behavior estimated to be suitable as a trigger for executing a predetermined process among a plurality of speeches/behaviors extractable from a behavior log of the user, wherein
the notification control unit further notifies the user of an inquiry whether or not execution of the candidate speech/behavior estimated from the behavior log is to be applied as the trigger, and
the candidate speech/behavior is estimated based on a number of times by which the speech/behavior is extracted from the behavior log.

REFERENCE SIGNS LIST

10 INFORMATION PROCESSING TERMINAL
110 SERVER COMMUNICATION UNIT
120 DISPLAY UNIT
130 VOICE OUTPUT UNIT
140 IMAGE PICKUP UNIT
150 VOICE INPUT UNIT
160 SENSOR UNIT
180 CONTROL UNIT
20 INFORMATION PROCESSING SERVER
210 COMMUNICATION UNIT
220 RECOGNITION UNIT
230 BEHAVIOR-LOG ACCUMULATION UNIT
240 ESTIMATION UNIT
250 APPLICATION UNIT
260 NOTIFICATION CONTROL UNIT
270 PROCESS CONTROL UNIT
30 NETWORK

The invention claimed is:

1. An information processing device comprising a processor configured to:
notify a user of information about a candidate speech or a candidate behavior estimated for use as a trigger for executing a predetermined process among a plurality of speeches or behaviors extractable from a behavior log of the user; and
notify the user of an inquiry whether or not to apply as the trigger execution of the candidate speech or the candidate behavior estimated from the behavior log,
wherein the candidate speech or the candidate behavior is estimated based on a number of times by which the speech or behavior is extracted from the behavior log.

2. The information processing device according to claim 1, wherein
the candidate speech or the candidate behavior is the predetermined speech or behavior having been extracted a number of times lower than a predetermined number among the plurality of predetermined speeches or behaviors extracted from the behavior log.

3. The information processing device according to claim 1, wherein the processor is further configured to
notify the user of an inquiry whether or not the candidate speech or the candidate behavior including a combination of a plurality of the predetermined speeches or behaviors is to be applied as the trigger.

4. The information processing device according to claim 3, wherein the candidate speech or the candidate behavior including the combination of the plurality of predetermined speeches or behaviors is estimated for use as the trigger when all of the predetermined speeches or behaviors of the plurality of predetermined speeches or behaviors extracted from the behavior log are recognized by a predetermined number of times or more.

5. The information processing device according to claim 1, wherein the processor is further configured to notify the user of an inquiry asking which of the candidate speech or the candidate behavior is to be applied as the trigger among the plurality of estimated candidate speeches or behaviors.

6. The information processing device according to claim 1, wherein the processor is further configured to notify the user of an inquiry asking to which of the trigger for executing the predetermined process among the plurality of predetermined processes the estimated candidate speech or candidate behavior is to be applied.

7. The information processing device according to claim 1, wherein the processor is further configured to notify the user of an inquiry whether or not execution of the estimated candidate speech or candidate behavior is to be applied as the trigger depending on a predetermined situation of the user.

8. The information processing device according to claim 1, wherein the information about the candidate speech or candidate behavior includes at least a category of the candidate speech or candidate behavior.

9. The information processing device according to claim 1, wherein the information about the candidate speech or candidate behavior includes at least a magnitude of the candidate speech or candidate behavior.

10. The information processing device according to claim 9, wherein the processor is further configured to notify the user whether or not the magnitude of the speech or behavior of the trigger is to be changed when an erroneous ignition of the speech or behavior applied as the trigger is estimated.

11. The information processing device according to claim 1, wherein the information about the candidate speech or candidate behavior includes at least the number of times of the candidate speech or candidate behavior.

12. The information processing device according to claim 11, wherein the processor is further configured to notify the user whether or not the number of times of the speech or behavior of the trigger is to be changed when an erroneous ignition of the speech or behavior applied as the trigger is estimated.

13. The information processing device according to claim 1, wherein
the candidate speech or candidate behavior includes at least one gesture, and
the processor is further configured to notify the user of an inquiry whether or not execution of the gesture is to be applied as the trigger.

14. The information processing device according to claim 1, wherein
the candidate speech or candidate behavior includes at least one speech, and
the processor is further configured to notify the user of an inquiry whether or not execution of the speech is to be applied as the trigger.

15. The information processing device according to claim 1, wherein
the predetermined process is executed by a wearable device.

16. The information processing device according to claim 1, wherein
the predetermined process is executed by a hearable device.

17. The information processing device according to claim 1, wherein the processor is configured to:
estimate the candidate speech or candidate behavior suitable as the trigger for executing the predetermined process among the plurality of predetermined speeches or behaviors recognized from the behavior log; and
estimate the candidate speech or candidate behavior based on the number of times of the speech or behavior extractable from the behavior log.

18. An information processing method, implemented by a processor, comprising:
notifying a user of information about a candidate speech or a candidate behavior estimated for use as a trigger for executing a predetermined process among a plurality of speeches or behaviors extractable from a behavior log of the user; and
further notifying the user of an inquiry whether or not to apply as the trigger execution of the candidate speech or candidate behavior estimated from the behavior log, wherein
the candidate speech or candidate behavior is estimated based on a number of times by which the speech or behavior is extracted from the behavior log.

19. A non-transitory computer readable medium storing instructions that, when executed by one or more processors, cause a computing device to perform a method that comprises:
notifying a user of information about a candidate speech or a candidate behavior estimated for use as a trigger for executing a predetermined process among a plurality of speeches or behaviors extractable from a behavior log of the user; and
notifying the user of an inquiry whether or not to apply as the trigger execution of the candidate speech or candidate behavior estimated from the behavior log, and
wherein the candidate speech or candidate behavior is estimated based on a number of times by which the speech or behavior is extracted from the behavior log.

* * * * *